(12) United States Patent
Mumick et al.

(10) Patent No.: US 10,110,748 B2
(45) Date of Patent: Oct. 23, 2018

(54) ROUTING INCOMING CALLS MADE TO ONE OR MORE UNREACHABLE NUMBERS INTO A DATA CLIENT

(71) Applicant: Kirusa, Inc., New Providence, NJ (US)

(72) Inventors: Inderpal Singh Mumick, Berkely Heights, NJ (US); Surinder Singh Anand, Highland, NJ (US)

(73) Assignee: Kirusa, Inc., New Providence, NJ (US)

( * ) Notice: Subject to any disclaimer, the term of this patent is extended or adjusted under 35 U.S.C. 154(b) by 0 days.

(21) Appl. No.: 15/429,133

(22) Filed: Feb. 9, 2017

(65) Prior Publication Data

US 2017/0237860 A1    Aug. 17, 2017

Related U.S. Application Data

(60) Provisional application No. 62/294,289, filed on Feb. 11, 2016.

(51) Int. Cl.
| | |
|---|---|
| *H04M 3/54* | (2006.01) |
| *H04L 29/08* | (2006.01) |
| *H04L 29/12* | (2006.01) |
| *H04W 4/02* | (2018.01) |
| *H04W 12/06* | (2009.01) |
| *H04M 3/533* | (2006.01) |

(52) U.S. Cl.
CPC .......... *H04M 3/543* (2013.01); *H04L 61/605* (2013.01); *H04L 67/306* (2013.01); *H04M 3/53308* (2013.01); *H04W 4/025* (2013.01); *H04W 12/06* (2013.01)

(58) Field of Classification Search
CPC ..... H04W 12/06; H04W 4/025; H04W 12/04; H04W 12/08
See application file for complete search history.

(56) References Cited

U.S. PATENT DOCUMENTS

| | | | | |
|---|---|---|---|---|
| 2003/0224795 | A1* | 12/2003 | Wilhoite | H04M 3/42229 455/445 |
| 2004/0266426 | A1* | 12/2004 | Marsh | H04W 36/0066 455/426.2 |
| 2005/0186960 | A1* | 8/2005 | Jiang | H04L 29/06027 455/435.1 |
| 2012/0208505 | A1* | 8/2012 | Teng | H04M 3/48 455/411 |
| 2015/0201086 | A1* | 7/2015 | Abi | H04M 7/006 370/352 |

* cited by examiner

*Primary Examiner* — Jean Gelin
(74) *Attorney, Agent, or Firm* — Ash Tankha; Lipton, Weinberger & Husick

(57) ABSTRACT

A method and a call routing system (CRS) are provided for routing an incoming call made to one of multiple numbers of a user to a call receiving client application (CRCA) deployed on one or more user devices when the called number is not reachable. The CRS, in communication with the CRCA deployed on one or more user devices, sets up a user account using one or more of the user's multiple numbers. The CRS detects availability of the CRCA on one or more user devices over a data network to accept an incoming call. The CRS receives the incoming call made to one of the numbers, when the called number is not reachable. The CRS routes the incoming call to the CRCA on one or more user devices over the data network on detecting the availability of the CRCA on one or more user devices over the data network.

32 Claims, 13 Drawing Sheets

ROUTING INCOMING CALLS MADE TO ONE OR MORE UNREACHABLE NUMBERS INTO A DATA CLIENT

CROSS-REFERENCE TO RELATED APPLICATIONS

This application claims priority to and the benefit of the provisional patent application No. 62/294,289 titled "Routing Incoming Calls Made To One Or More Unreachable Numbers Into A Data Client", filed in the United States Patent and Trademark Office on Feb. 11, 2016. The specification of the above referenced patent application is incorporated herein by reference in its entirety.

BACKGROUND

As mobile networks and data communication technologies have evolved, calls can be made and received on phones not only using voice calling capabilities of mobile networks, but also using a data communication capability of these phones. Applications can also be run on data enabled phones, for example, smartphones, to allow users to obtain various services through data networks.

There are times when a user's phone does not have access to a telecommunications network, for example, a voice network for making and receiving voice calls, but has a data network capability on the phone using a carrier's mobile data network or a Wi-Fi® connection of Wi-Fi Alliance Corporation. As used herein, "carrier" refers to a telecommunications network operator or service provider that provides communication services, for example, telecommunication services to end users and controls elements, for example, radio spectrum allocation, wireless network infrastructure, back haul infrastructure, billing systems, customer care systems, provisioning computer systems, repair systems, etc., required for delivering communication services to the end users. For example, a user's phone may be out of mobile network coverage but is connected to a Wi-Fi® network. In another case, the user may explicitly turn off the mobile network on the phone while roaming to avoid high roaming charges, but the user's phone may be connected to a Wi-Fi® network. In such cases, the user is unable to make or receive calls using a voice calling capability of the telecommunications network. When a calling party makes a call to a user's mobile number, the call cannot be routed to the user's phone in the above cases and the call attempt is incomplete. If the user has a conventional call completion service such as missed call notifications or voicemail enabled on the mobile number, the calling party will receive an option to send a voice message. However, the user is unable to receive the incoming call even if the user has data network capability on the phone. Hence, there is a need for routing an incoming call to a called party device using the data network capability of the phone when the called party device does not have a voice calling capability.

In another scenario, a user may have multiple numbers. However, at a particular time, the user may not have access to all of the multiple numbers. As a result, the user is unable to receive an incoming call from a calling party to one of the multiple numbers to which the user does not have access at the time. Hence, there is a need for routing an incoming missed call received for one of the numbers belonging to the user to an application of a user device, for example, a mobile phone or a tablet using a data network.

Hence, there is a long felt need for a method and a system for routing an incoming call made to one of multiple numbers of a user, to a call receiving client application deployed on one or more user devices when one of the numbers being called is not reachable. Moreover, there is a need for a method and a system for routing an incoming call to a call receiving client application deployed on one or more user devices using a data network when the user devices do not have a voice calling capability on a telecommunications network. Furthermore, there is a need for a method and a system for routing an incoming missed call received for one of the numbers belonging to the user, to a call receiving client application deployed on one or more user devices using the data network.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above recited need for routing an incoming call made to one of multiple numbers of a user, to a call receiving client application deployed on one or more user devices when one of the numbers being called is not reachable. Moreover, the method and the system disclosed herein route an incoming call to the call receiving client application deployed on one or more user devices using a data network when the user devices do not have a voice calling capability on a telecommunications network. Furthermore, the method and the system disclosed herein route an incoming missed call received for one of the numbers belonging to the user, to the call receiving client application deployed on one or more user devices using the data network.

The method disclosed herein employs a call routing system comprising one or more processors configured to execute computer program instructions for routing an incoming call made to one of multiple numbers of a user, to a call receiving client application (CRCA) deployed on one or more of multiple user devices when one of the numbers is not reachable. The call routing system, in communication with the CRCA deployed on one or more of the user devices, sets up a user account for the user using one or more of the multiple numbers of the user. The call routing system detects availability of the CRCA on one or more of the user devices over a data network to accept an incoming call. The call routing system receives the incoming call made to one of the numbers, when the called number is not reachable. The call routing system routes the received incoming call to the CRCA on one or more of the user devices over the data network on detecting the availability of the CRCA on one or more of the user devices over the data network.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
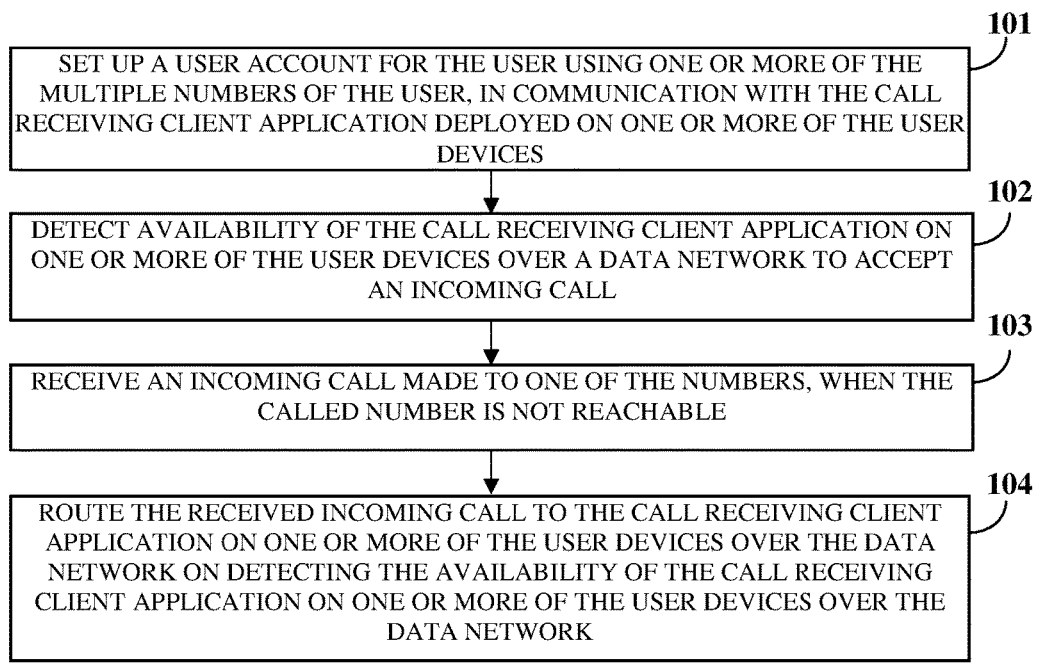
FIG. 1 illustrates a method for routing an incoming call made to one of multiple numbers of a user, to a call receiving client application deployed on one or more of multiple user devices when one of the numbers being called is not reachable.

FIG. 1 illustrates a method for routing an incoming call made to one of multiple numbers of a user to a call receiving client application (CRCA), also referred to as a "data client", deployed on one or more of multiple user devices when one of the numbers being called is not reachable. The number being called is deemed not reachable, for example, when one or more of the user devices associated with the number do not have access to a telecommunications network, for example, a voice network, or when one or more of the user devices associated with the number are out of network coverage, or when one or more of the user devices associated with the number are switched off, or when the user disables the telecommunications network on one or more user devices associated with the number to avoid high roaming charges, or when the user is roaming, that is, using a roaming network, and does not have a prepaid credit balance to receive an incoming call, or when the user does not have a prepaid credit balance to receive an incoming call in a country where incoming calls are charged even while not roaming, or when the number is busy, etc. The number being called is deemed not reachable also when an incoming call to the number is unanswered, for example, when the user is not able to answer the incoming call if the user device associated with the number is not within easy reach or is left at home. The number being called is deemed not reachable also when the user is busy on another call on the user device associated with the number, where the incoming call is first delivered. The telecommunications network is, for example, a wired telephony network, a wireless network, a voice network, a signaling system number 7 (SS7) network, a mobile telecommunication network, a public telephone network, etc.

The method disclosed herein employs a call routing system comprising one or more processors configured to execute computer program instructions for routing an incoming call made to one of multiple numbers of a user, to a call receiving client application (CRCA) deployed on one or more of multiple user devices when one of the numbers being called is not reachable. The user downloads and installs a CRCA on one or more of multiple user devices, for example, personal computers, tablet computing devices, mobile computers, mobile phones, smartphones, portable computing devices, laptops, personal digital assistants, etc., having operating systems, for example, the Android® operating system of Google Inc., the iOS® operating system of Apple Inc., the Windows® operating system of Microsoft Corporation, the Blackberry® of Blackberry Limited Corporation, or any other device with a smart operating system.

The call receiving client application (CRCA) on one or more of multiple user devices communicates with the call routing system via a data network. As used herein, "data network" refers to a communication network over which data can be transmitted, for example, between user devices, between a server and a user device, between a media platform and a user device, etc. Examples of the data network comprise the Internet, an intranet, a wireless network, a communication network that implements Bluetooth® of Bluetooth Sig, Inc., a network that implements Wi-Fi® of Wi-Fi Alliance Corporation, a cellular operator's data network such as a carrier's mobile data network, a third generation (3G) mobile communication network, a fourth generation (4G) mobile communication network, a fifth generation (5G) mobile communication network, a long-term evolution (LTE) mobile communication network, an ultra-wideband communication network (UWB), a wireless universal serial bus (USB) communication network, a communication network that implements ZigBee® of ZigBee Alliance Corporation, a general packet radio service (GPRS) network, an internet connection network, an infrared communication network, etc., or a network formed from any combination of these networks.

The call routing system comprises an incoming call routing server (ICRS), a media platform, and a voicemail/missed call alert (MCA) server that completes incomplete calls. In an embodiment, the call routing system is implemented in a distributed cloud computing environment with a carrier ICRS deployed in a carrier's data center and a cloud ICRS deployed outside the carrier's data center, where the carrier ICRS communicates with the cloud ICRS over a secure data network. As used herein, "distributed cloud computing environment" refers to a processing environment comprising configurable computing physical and logical resources, for example, networks, servers, storage media, applications, virtual machines, services, etc., and data distributed over one or more networks comprising, for example, secure data networks and public data networks such as the internet. The distributed cloud computing environment provides on-demand network access to a shared pool of the distributed computing physical and logical resources. Also, as used herein, "secure data network" refers to a data network controlled by the carrier to allow selective access from authorized servers and devices outside the carrier's data center to servers inside the carrier's data center, while preventing unauthorized access, misuse, and modification of network resources. In another embodiment where security policies of the carrier do not allow direct communication between the media platform in the carrier's data center, herein referred to as a "carrier media platform", and the CRCA on one or more user devices, the call routing system comprises the carrier ICRS, the cloud ICRS, the carrier media platform, and a cloud media platform implemented in the distributed cloud computing environment, where the carrier media platform communicates with the cloud media platform over the secure data network. In this embodiment, the cloud media platform communicates with the CRCA on one or more user devices over a public data network. As used herein, "public data network" refers to a data network that is open to public access and accessible in the public domain by user devices. In another embodiment, instead of the carrier ICRS, the call routing system comprises a voicemail/MCA server with incoming call routing functionality. The voicemail/MCA server with incoming call routing functionality communicates with the cloud ICRS over the secure data network in the distributed cloud computing environment. To implement the distributed cloud computing environment, the call routing system is developed, for example, using one or more of the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc.

The incoming call routing server (ICRS) of the call routing system disclosed herein, in communication with the call receiving client application (CRCA) deployed on one or more of the user devices, sets 101 up a user account for the user using one or more of the multiple numbers of the user. In an embodiment, the ICRS allows the user to set up the user account with a single number associated with a subscriber identity module (SIM) card that the user owns. In another embodiment, if the user has multiple subscriber identity module (SIM) cards, where each of the SIM cards is associated with a distinct number, the ICRS allows the user to set up the user account with each of these distinct numbers. In an embodiment, the ICRS allows the user to set up the user account with multiple numbers associated with a single carrier in a single geographical location, or with different carriers in a single geographical location, or with a single carrier in multiple different geographical locations, or with different carriers in different geographical locations. For example, the ICRS allows the user to set up the user account with multiple numbers associated with the same country and carrier, or with different carriers in the same country, or with multiple carriers in different countries. In an embodiment, the ICRS sets up the user account for the user using the CRCA on a single user device. In another embodiment, if the user owns multiple user devices, the user can download and configure the CRCA on each of the multiple user devices owned by the user. In this embodiment, the ICRS allows the user to receive the incoming call on another user device when the user is busy on another call on one user device, where the incoming call is first delivered. In an embodiment, the user can download and configure the CRCA on multiple user devices that are manufactured by the same vendors, for example, Apple Inc., or Samsung Electronics Co., Ltd., and that run the same type of operating system, for example, the iOS® operating system of Apple Inc., the Android® OS of Google Inc., the Windows® operating system of Microsoft Corporation, etc. In another embodiment, the user can download and configure the CRCA on multiple user devices manufactured by different vendors and running different operating systems. The data inputted to the ICRS, for example, the numbers received from the user and account information to set up the user account is transformed, processed, and executed by an algorithm in the ICRS.

After downloading the call receiving client application (CRCA) on one or more user devices, the user sets up the CRCA with the incoming call routing server (ICRS) using one of the numbers that the user owns. The CRCA and the ICRS set up the user account for the user using a number provided by the user. To ensure that the user owns the number provided by the user, the ICRS then validates the number received from the user using one or more of multiple authentication mechanisms. An example of an authentication mechanism implemented by the ICRS comprises transmitting a validation code to the number of the user to be validated by the ICRS via a message sent by the ICRS or an outbound dialing call initiated by the media platform of the call routing system, receiving an input code captured by the CRCA from one of the user devices associated with the number, and matching the received input code with the transmitted validation code. Another example of an authentication mechanism implemented by the ICRS comprises sending a message to the number of the user to be validated by the ICRS, and receiving a confirmation from the CRCA that the sent message is received on one of the user devices indicating that one of the user devices contains a subscriber identity module (SIM) with the number of the user to be validated. Another example of an authentication mechanism implemented by the ICRS comprises receiving a message sent from the CRCA on one of the user devices to a predetermined number and matching a source number of the message with the number of the user to be validated. Another example of an authentication mechanism implemented by the ICRS comprises receiving a missed call placed by the CRCA on one of the user devices to a predefined number and matching a source number of the missed call with the number of the user to be validated. The ICRS assigns the number used for setting up the user account as a primary number for the user account.

The incoming call routing server (ICRS) allows the user to link additional numbers to the same user account. The ICRS receives the additional numbers owned by the user, validates each additional number using one of the authentication mechanisms disclosed above, and links the received additional numbers to the same user account. The ICRS performs one of the authentication mechanisms, for example, receiving a validation code captured by the call receiving client application (CRCA) from a user device and matching the received validation code with the validation code sent by the ICRS to the number via a short message service (SMS) message; receiving a validation code captured by the CRCA from the user device and matching the received validation code with the validation code played on an outbound dialing (OBD) call initiated by the ICRS; receiving a confirmation from the CRCA that an SMS message sent from the ICRS to the number to be validated is received on one of the user devices indicating that the user device that received the SMS message contains a subscriber identity module (SIM) with the number to be validated; receiving an SMS message sent from the CRCA on one of the user devices to a predetermined number and matching the source number of the SMS message with the number to be validated; receiving a missed call placed by the CRCA on one of the user devices to a predefined number and matching an originating number of the missed call with the number to be validated, etc., for all the multiple numbers linked by the user to the user account. The ICRS designates each of the linked additional numbers as secondary numbers for the user account. Each of the numbers associated with the user account, for example, the primary number or the secondary number is a validated number for the user account. The ICRS allows the user to change the primary number of the user account at any time by selecting one of the validated numbers as the updated primary number for the user account. The ICRS also allows the user to delink the validated primary number or any of the validated secondary numbers from the user account. To delink the primary number, the user needs to designate another validated number as the primary number before delinking the primary number. The ICRS receives the other validated number from the CRCA and designates the other validated number as the updated primary number before delinking or removing the primary number.

The user can also set a password to allow the user to login or sign into the call receiving client application (CRCA) from the same user device or from any other user device deploying the CRCA. The incoming call routing server (ICRS) sets the password for logging into the CRCA deployed on one or more of the user devices with one or more numbers of the user. The user can login to the CRCA from multiple user devices using the same user account set up by the ICRS for the user. The user needs to validate the number by entering the password or by using the authentication mechanisms disclosed above. The ICRS validates and links the numbers of the user through one or more authentication mechanisms disclosed above. In an embodiment, the ICRS validates the number by providing the authentication information of the user. The ICRS maintains a database of all user accounts and the validated numbers associated with each user account. The database comprises a column that indicates which of the user accounts have one or more of the user devices with numbers that are currently linked to the user account set up by the ICRS to receive calls over a data network. The ICRS updates the status of each user account, that is, whether a user account is registered to receive incoming calls on the data network or not, in the database. The ICRS also stores details about the user device from which the user has registered to be available to receive incoming calls over the data network using the CRCA on the user device. In an embodiment, the ICRS sets up the user account with the CRCA deployed on each of the user devices and associates one or more of the numbers of the user with the user account. A generic computer using a generic program cannot validate one or more numbers of the user and set up the user account with the validated numbers to receive incoming calls over the data network using the CRCA deployed on one or more user devices in accordance with the method steps disclosed above.

The incoming call routing server (ICRS) detects 102 availability of the call receiving client application (CRCA) on one or more of the user devices over the data network to accept an incoming call, on receiving a query for the availability of the CRCA on the user devices from the media platform. In an embodiment, the ICRS detects the availability of the CRCA on one or more of the user devices over the data network, when the CRCA is connected to the data network and registers itself with the ICRS to indicate the availability of the CRCA to accept incoming calls. "Registration of the CRCA with the ICRS" refers to indicating availability of the CRCA on a user device when the CRCA connects to the data network and the user logs into the CRCA on the user device. That is, the ICRS detects availability of the CRCA by detecting a connection of the CRCA to the data network and registration of the CRCA on one or more of the user devices. The CRCA deregisters from the user device when the user logs out or signs out from the user device. The ICRS detects the deregistration of the CRCA on one or more of the user devices. The ICRS detects all other scenarios when the CRCA is no longer connected to the data network and deregisters the CRCA. For example, the ICRS detects when the CRCA is disabled or deactivated on the user device, or when the user device on which the CRCA is installed, is switched off, etc. The ICRS also detects when the CRCA is deregistered on one or more of the user devices to allow the CRCA to re-register when the CRCA connects to the data network. A generic computer using a generic program cannot detect availability of the CRCA on one or more of the user devices over the data network to accept an incoming call in accordance with the method steps disclosed above.

When a calling party calls one of the numbers of the user, for example, the primary number or one of the secondary numbers linked to the user account, the media platform of the call routing system receives 103 the incoming call made to the called number, when the called number is not reachable, for example, when the subscriber identity module (SIM) card associated with the called number is disconnected from the user device, or when the user device associated with the called number is in an out of coverage area, or when there is network congestion, or when the user device associated with the called number does not have access to a telecommunications network, or when the user device associated with the called number is switched off, or when the called number is busy, or when the incoming call to the called number is unanswered by the user, etc. As used herein, "calling party" refers to a user or a sender who originates a call or attempts to place a call to a called party device to communicate with the called party. Also, as used herein, "called party" refers to a user who is a recipient or an intended recipient of a call made by the calling party. When an incoming call is received, the incoming call routing server (ICRS) checks the database to determine whether there is a call receiving client application (CRCA) that is currently available to receive the incoming call, and then sends a response to the media platform to route the incoming call to an available CRCA.

The media platform routes 104 the received incoming call to the call receiving client application (CRCA) on one or more of the user devices over the data network on detecting the availability of the CRCA on one or more of the user devices over the data network, that is, on receiving the response that the CRCA is available on one or more of the user devices from the incoming call routing server (ICRS). In an embodiment, a carrier associated with each of the validated numbers of the user assigns a routing number, for example, a C number, to the call routing system for routing the received incoming call to the call routing system when one of the validated numbers is not reachable. As used herein, "routing number" refers to a call forwarding number or a translated number assigned for a carrier that owns one or more numbers linked to the user account. The routing number routes the incoming call to the media platform of the call routing system. The function of the C number is similar to a C number used for a call completion service and uses the same conditional call forwarding capabilities of a global system for mobile communications (GSM) network and a code division multiple access (CDMA) network as used for other call completion or voicemail and/or missed call solutions. The media platform receives the incoming call made to one of the numbers forwarded by the carrier via the assigned routing number, and determines whether one of the numbers is linked to the user account set up by the ICRS to route the incoming call to the CRCA on one or more user devices over the data network.

The incoming call routing server (ICRS) maintains a list of countries and carriers that support the incoming call routing service implemented by the method disclosed herein, along with the routing number, for example, the C number to be used for activating conditional call forwarding for routing incoming calls to the call routing system. When a user sets up the user account with a primary number, or adds a secondary number to the user account, the ICRS checks the database if the number has already activated conditional call forwarding for the incoming call routing service, or for the voicemail, missed call, or voicemail with a missed call service being implemented by the ICRS. If the number is not already activated for conditional call forwarding, the ICRS checks the database to find the C number to be used for conditional call forwarding in the country and carrier of the number. If the C number is assigned and configured for that country and carrier, then the ICRS further determines if the C number is integrated with a service provisioning platform of the carrier to send a command to activate conditional call forwarding. If the C number is integrated with the service provisioning platform, then the ICRS sends the command for activating conditional call forwarding for that number to the service provisioning platform. The ICRS captures a status of success or failure of the command from the response received from the service provisioning platform and stores the status in the database, and also communicates the status to the call receiving client application (CRCA) connected to that user account.

If the incoming call routing server (ICRS) is not integrated with the service provisioning platform of the carrier, then the ICRS sends the C number and the command to be used for activating conditional call forwarding to the call receiving client application (CRCA). The command for activating conditional call forwarding for numbers belonging to a global system for mobile communications (GSM) network is, for example, an unstructured supplementary service data (USSD) command "**004*<C_Number>#" from the user device containing the subscriber identity module (SIM) card associated with the user's number. As another example, the command for activating conditional call forwarding for numbers belonging to a code division multiple access (CDMA) network is to make a regular voice call to "*71<C_Number>". Depending on the capability of the user device on which the CRCA is installed, the CRCA executes the command to activate conditional call forwarding to the C number on its own, or prompts the user to click on an action button on a graphical user interface (GUI) provided by the CRCA to initiate the command, or instructs the user to dial the command from the user device's dialer. A generic computer using a generic program cannot route the received incoming call to the CRCA on one or more of the user devices over the data network on detecting the availability of the CRCA on one or more of the user devices over the data network in accordance with the method steps disclosed above.

In an embodiment, the media platform at the carrier's data center, that is, the carrier media platform, routes the received incoming call to the call receiving client application (CRCA) on one or more user devices over the data network via the cloud media platform deployed in the distributed cloud computing environment, when the incoming call is made to a number associated with the carrier that does not permit direct data communication between servers in the secure data network of the carrier and the user devices. In this embodiment, the cloud media platform communicates with the carrier media platform over the carrier's secure data network, and routes the received incoming call to the CRCA on one or more user devices over the public data network. In another embodiment, the media platform selects an optimum codec for communicating with the CRCA on one or more of the user devices based on available bandwidth between the media platform and the CRCA, and implements transcoding for converting a codec used for communication between a carrier's network component and the media platform to the optimum codec used for communication between the media platform and the CRCA.

When the calling party calls one of the validated numbers of the user that is not reachable, the carrier that owns the called number forwards the incoming call to the routing number. For example, a terminating mobile switching center (MSC) that handles the incoming call to the called number that is not reachable, routes the incoming call to the media platform via the routing number. The media platform queries the incoming call routing server (ICRS) to determine whether the call receiving client application (CRCA) on one or more user devices associated with the called number is currently registered to receive the incoming call on the data network. The ICRS receives the query from the media platform, checks the database of users to determine whether the CRCA on one or more user devices associated with the called number is registered with the ICRS to receive the incoming call over the data network, and transmits a response to the media platform. If the response from the ICRS indicates that there are one or more user devices with the CRCA available to receive the incoming call for the called number, the media platform routes the received incoming call to the registered CRCA on each of the user devices to allow the user to see and hear a ring for the incoming call on the CRCA. As used herein, "registered CRCA" refers to the CRCA that is available on a user device based on connection of the CRCA to the data network and the user logging into the CRCA on the user device. The user can answer the incoming call by accepting the incoming call on the CRCA. When the user answers the incoming call by accepting the incoming call on the registered CRCA on one user device, the registered CRCA stops the ring on the remaining user devices.

If the user does not accept the call from any of the user devices where the user has the call receiving client application (CRCA) installed and registered, for a preconfigured period of time, the media platform routes the received incoming call to an alerting server, for example, the voicemail/missed call alert (MCA) server of the call routing system and executes a call complete call flow. The call complete call flow comprises a missed call notification, voicemail, etc. That is, the voicemail/MCA server provides options to the calling party to record a voice message or hang up the incoming call to complete the call. If the calling party records a voice message, the voicemail/MCA server transmits a notification to the CRCA or a short message service (SMS) message to the user device to allow the user to call and to listen to the voice message. If the calling party does not record a voice message, the voicemail/MCA server transmits a missed call notification into the CRCA or as an SMS message to the user device. Furthermore, when the incoming call routing server (ICRS) detects an unavailability of the CRCA on each of the user devices, the ICRS requests the media platform to route the received incoming call to the voicemail/MCA server. By implementing the method disclosed herein, a user can receive calls made to multiple numbers associated with the user account into the CRCA over a data connection, for example, an internet protocol connection, when the calls cannot be delivered as the called numbers are unreachable.

The call routing system disclosed herein implements one or more specific computer programs for routing an incoming call made to one of multiple numbers of a user, to the call receiving client application (CRCA) deployed on one or more of multiple user devices to which a user has access, when the called number is not reachable. The call routing system routes the incoming call to the CRCA deployed on a user device using a data network, when the user device does not have access to a voice network, for example, when the user device is out of network coverage, or when the user explicitly turns off a mobile network on the user device while roaming to avoid high roaming charges, etc., or when the user does not have access to all of the user's multiple numbers, etc., for making and receiving voice calls, but has a data network capability on the user device. The call routing system processes and transforms the received incoming call that is incomplete to a complete call by routing the received incoming call to the CRCA on one or more user devices. The call routing system also transforms a codec used for communication between the carrier's network component and the media platform to an optimum codec selected for communication between the media platform and the CRCA. The call routing system also processes and transforms the received incoming call into a missed call alert by forwarding the received incoming call to an alerting server when the CRCA is not available in one or more of the user devices or when the CRCA is not connected to the data network.

The method disclosed herein improves the functionality of a computer and provides an improvement in communication related technology related to routing an incoming call made to one of multiple numbers of a user, to the call receiving client application (CRCA) deployed on one or more of multiple user devices as follows: On implementing the method disclosed herein, the incoming call routing server (ICRS) of the call routing system, in communication with the CRCA deployed on one or more of the user devices, routes the incoming call to the CRCA. The call routing system processes the numbers received from the user, creates a user account, and maintains the user account in the database for each of the user devices. The media platform in the call routing system receives the incoming call made to one of the numbers via the assigned routing number and sends a query to the ICRS to determine registration of the CRCA on one or more of the user devices with the ICRS. Based on the response from the ICRS, the media platform through the use of separate and autonomous computer programs processes the received incoming call made to one of the user's numbers that is not reachable to determine the availability of the CRCA and route the incoming call to the CRCA available on one or more of the user devices via the data network.

The focus of the method and the call routing system disclosed herein is on an improvement to communication technology and computer functionalities, and not on tasks for which a generic computer is used in its ordinary capacity. Accordingly, the method and the call routing system disclosed herein are not directed to an abstract idea. Rather, the method and the call routing system disclosed herein are directed to a specific improvement to the way the processors in the call routing system and the user device operate, embodied in, for example, setting up a user account for the user, validating the numbers received from the user to set up the user account, determining the availability of the call receiving client application (CRCA) on one or more of multiple user devices by detecting a connection of the CRCA to the data network and detecting registration of the CRCA on one or more of the user devices, selecting an optimum codec for communicating with the CRCA on one or more of the user devices, and routing the incoming call to the available CRCA on one or more of the user devices over the data network.

In the method disclosed herein, the design and the flow of data and interactions between a calling party device, network components of the carrier, the call routing system, and the user devices that deploy the call receiving client application (CRCA) are deliberate, designed, and directed. The numbers received from the user to set up the user account and the incoming call received from the calling party device are processed by the call routing system to steer the call routing system towards a finite set of predictable outcomes. The interactions between the calling party device, the carrier's network components, the call routing system, and the user devices that deploy the CRCA allow the call routing system to route the received incoming call to the available CRCA via the data network in the absence of a voice network. From the numbers provided by the user, the call routing system, through the use of separate and autonomous computer programs, processes the numbers to set up the user account and maintain the database of user accounts associated with all the user devices, and processes a query to route the incoming call to an available CRCA when one of the numbers is not reachable. To set up the user account for the user using one or more of multiple numbers of the user in communication with the CRCA deployed on one or more of multiple user devices, detect availability of the CRCA on the user devices over the data network to accept the incoming call, receive the incoming call made to one of the numbers, when one of the numbers is not reachable, and route the received incoming call to the available CRCA on one or more of the user devices over the data network requires four or more separate computer programs and subprograms, the execution of which cannot be performed by a person using a generic computer with a generic program. The steps performed by the call routing system disclosed above are tangible, provide useful results, and are not abstract. The hardware and software implementation of the call routing system is an improvement in computer related and communication technology.

Figure 2A:
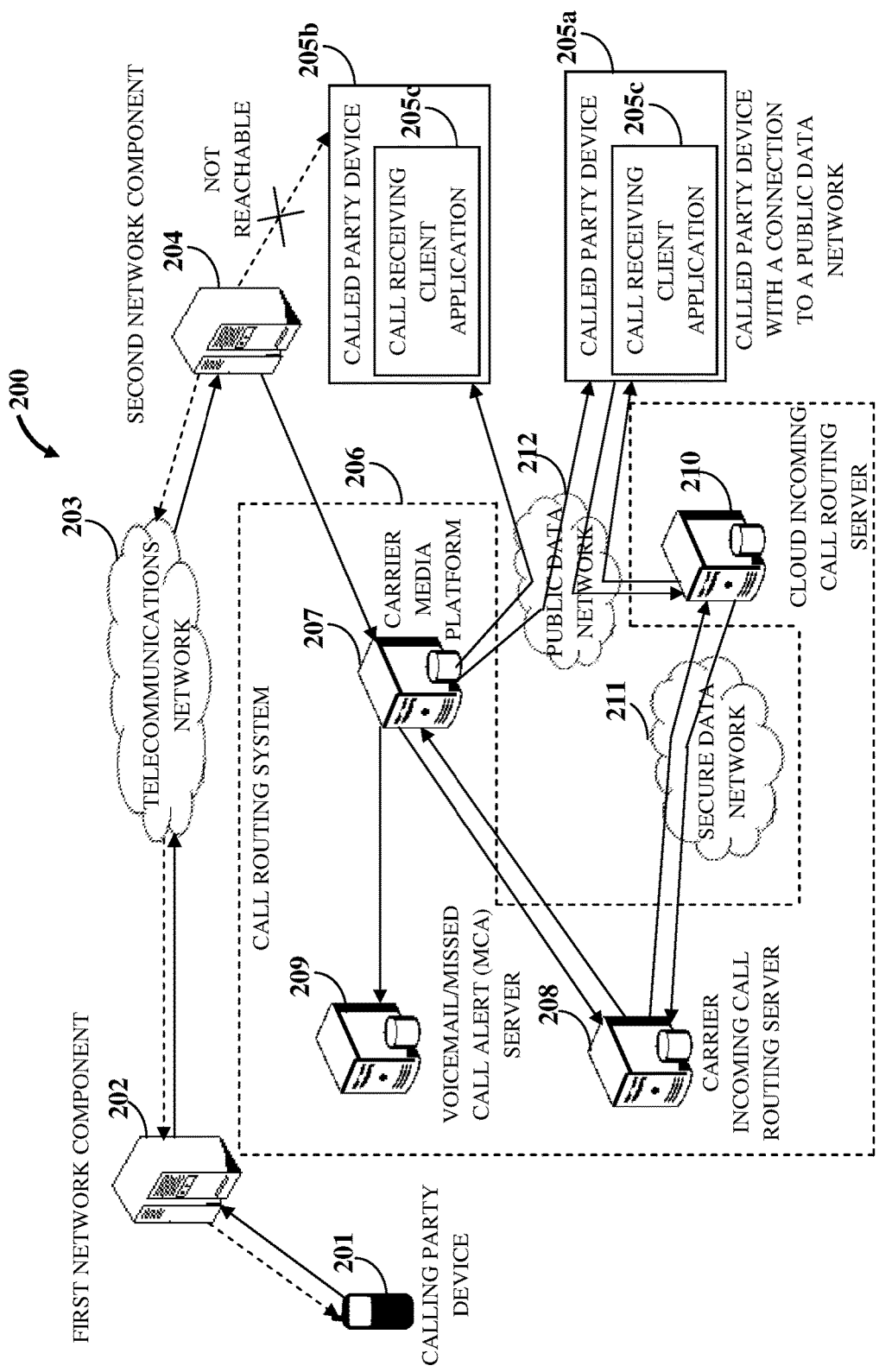
FIG. 2A exemplarily illustrates a system comprising a carrier media platform, a carrier incoming call routing server, and a cloud incoming call routing server implemented in a distributed cloud computing environment, for routing an incoming call made to one of multiple numbers of a user, to the call receiving client application deployed on one or more of multiple user devices when one of the numbers being called is not reachable.

FIG. 2A exemplarily illustrates a system 200 comprising the carrier media platform 207, the carrier incoming call routing server (ICRS) 208, and the cloud ICRS 210 implemented in a distributed cloud computing environment, for routing an incoming call made to one of multiple numbers of a user, to the call receiving client application (CRCA) 205c deployed on one or more of multiple user devices, herein referred to as "called party devices", when one of the numbers being called is not reachable. The system 200 disclosed herein comprises the call routing system 206 in communication with a calling party device 201, called party devices 205a and 205b, and their associated network components 202 and 204. The network components comprise a first network component 202 associated with the calling party device 201 and a second network component 204 associated with the called party devices 205a and 205b. As used herein, the terms "first network component" and "second network component" refer, for example, to a mobile switching center (MSC), a base station subsystem (BSS), a radio access network (RAN), a telephone exchange, a telephone switch, etc., serving the calling party device 201 and the called party devices 205a and 205b respectively. The first network component 202 is, for example, an originating switch or an originating MSC associated with the calling party device 201. The second network component 204 is, for example, a terminating switch or a terminating MSC associated with the called party devices 205a and 205b. The second network component 204 is either the same as the first network component 202 or one of multiple network components excluding the first network component 202.

The call routing system 206 is accessible to the calling party device 201 and the called party devices 205a and 205b, for example, through a broad spectrum of technologies and devices such as personal computers with access to the internet, internet enabled cellular phones, tablet computing devices, etc. The first network component 202 is connected to the second network component 204 via a telecommunications network 203. In an embodiment, the call routing system 206 is implemented as a system of multiple servers, for example, the carrier media platform 207, the voicemail/ missed call alert (MCA) server 209, the carrier incoming call routing server (ICRS) 208, and the cloud ICRS 210, that routes an incoming call made to one of multiple numbers of a user, to the call receiving client application (CRCA) 205c deployed on one or more called party devices 205a and 205b when one of the numbers is not reachable. The carrier media platform 207, the carrier ICRS 208, and the voicemail/MCA server 209 are part of the carrier's data center. The carrier media platform 207, in communication with the voicemail/ MCA server 209, implements call completion. The voicemail/MCA server 209 transmits a voicemail message or missed call notifications to the calling party device 201 via the telecommunications network 203. The carrier media platform 207 communicates with the CRCA 205c on the called party devices 205a and 205b over a public data network 212. The carrier media platform 207 routes the incoming call via the public data network 212 to the called party device, for example, 205a or 205b on which the CRCA 205c is deployed. The carrier media platform 207 communicates with the mobile switching center (MSC) or a mobile soft switch (MSS) in the carrier over a protocol supported by the carrier. When the carrier media platform 207 directly connects with the CRCA 205c on the called party device 205a or 205b over the public data network 212, the carrier media platform 207 communicates with the CRCA 205c to bridge the incoming call received from the carrier with a voice over internet protocol (VoIP) call with the CRCA 205c.

Consider an example where calling party A using the calling party device 201 attempts to call the called party device 205b of called party B. The first network component 202, for example, the originating mobile switching center (MSC) associated with the calling party device 201 receives the call attempt to contact called party B from the calling party device 201. The first network component 202 routes the received call attempt to the second network component 204, for example, the terminating MSC, associated with called party B for establishing a communications link between the calling party device 201 and the called party device 205b over the telecommunications network 203. The second network component 204 routes the call to the called party device 205b, which results in an unanswered or incomplete call attempt, for example, due to the called party device 205b being in an out of coverage area, or due to the called party device 205b being switched off, or due to access to the telecommunications network 203 being disabled on the called party device 205b, etc. The second network component 204 then redirects the unanswered call attempt to a fixed C number and routes the unanswered call attempt to the carrier media platform 207. The carrier media platform 207 queries the carrier incoming call routing server (ICRS) 208 to determine whether the call receiving client application (CRCA) 205c deployed on the called party device 205a or 205b associated with the called party number has data connectivity or a connection to the public data network 212, and whether the user has logged into the CRCA 205c on the called party device 205a or 205b. The carrier ICRS 208 receives the query from the carrier media platform 207 about the number for an incoming call. The response to the query is, for example, "available with an address" or "not available". If the response from the carrier ICRS 208 is "available", the carrier media platform 207 routes the incoming call to the same user device, that is, the called party device 205b associated with the number, or a different user device, that is, the called party device 205a associated with the number. In this example, the carrier media platform 207, in communication with the carrier ICRS 208, determines that the called party device 205a has a connection to the public data network 212 and that the user has logged into the CRCA 205c on the called party device 205a. The carrier media platform 207 then routes the incoming call to the CRCA 205c on the called party device 205a. If the response from the carrier ICRS 208 is "not available", the carrier media platform 207 routes the incoming call to the voicemail/MCA server 209.

In an embodiment, the call routing system 206 is implemented in a distributed manner with the carrier incoming call routing server (ICRS) 208 deployed inside the carrier's data center and the cloud ICRS 210 deployed outside the carrier's data center in the distributed cloud computing environment, for routing the incoming call made to one of multiple numbers of the user, to the call receiving client application (CRCA) 205c deployed on one or more called party devices 205a and 205b when one of the numbers is not reachable. The cloud ICRS 210 is deployed on a cloud service platform, for example, AWS® of Amazon Technologies, Inc., or the Google® Cloud platform of Google Inc. In an embodiment, there is a single, central cloud ICRS 210 that communicates with one or more carrier ICRSs 208 deployed in each carrier, where the call routing functionality of the method disclosed herein is deployed inside the carrier's data center. The call routing system 206 is implemented in a distributed manner with the cloud ICRS 210, one or more carrier ICRSs 208, and one or more carrier media platforms 207. The cloud ICRS 210 communicates with the carrier ICRS 208 over a secure data network 211. The cloud ICRS 210 also communicates with the CRCA 205c over data, that is, over the public data network 212.

The cloud incoming call routing server (ICRS) 210 acts as a relay or a proxy between the call receiving client application (CRCA) 205c and the carrier ICRS 208. The cloud ICRS 210 implements the following functions comprising, for example, setting up the user account, maintaining a central database of all the users of the incoming call routing service, validating one or more numbers of the user, and sending a validation code request to the carrier ICRS 208, which in turn sends a short message service (SMS) message or performs outbound dialing (OBD) to the number being validated. Sending the validation code request comprises sending a validation code through an SMS message or sending the validation code by OBD. The cloud ICRS 210 further sets the primary number for the user account, adds the additional numbers, links and delinks the numbers to and from the user account, executes login and logout of the CRCA 205c deployed on one or more called party devices 205a and 205b, registers the CRCA 205c, deregisters the CRCA 205c, updates a registration status in the database, and notifies the carrier ICRS 208 to which the number is associated. The cloud ICRS 210 further detects the availability and unavailability of the CRCA 205c and notifies the carrier ICRS 208. The cloud ICRS 210 also responds to queries from the carrier ICRS 208. The carrier ICRS 208 executes and sends the validation code requests received from the cloud ICRS 210 to the CRCA 205c, by sending the short message service (SMS) message or performing outbound dialing (OBD) to the number being validated. The carrier ICRS 208 receives registration and deregistration information of the CRCA 205c and stores the received information in a local database.

Figure 2B:
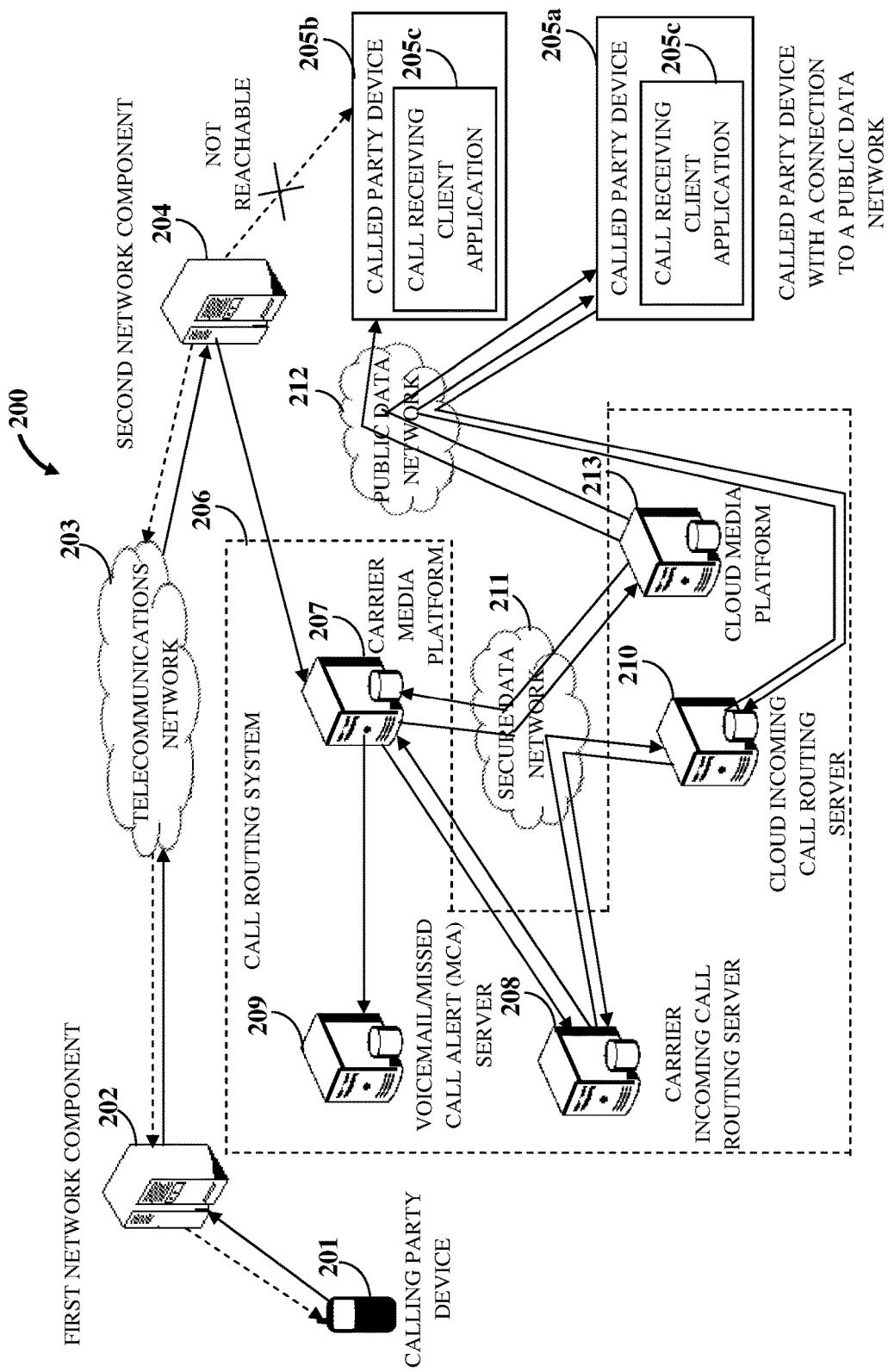
FIG. 2B exemplarily illustrates an embodiment of the system shown in FIG. 2A, further comprising a cloud media platform implemented in a distributed cloud computing environment, for routing an incoming call made to one of multiple numbers of a user, to the call receiving client application deployed on one or more of multiple user devices when one of the numbers being called is not reachable.

FIG. 2B exemplarily illustrates an embodiment of the system 200 shown in FIG. 2A, further comprising the cloud media platform 213 implemented in a distributed cloud computing environment, for routing an incoming call made to one of multiple numbers of a user, to the call receiving client application (CRCA) 205c deployed on one or more user devices, for example, called party devices 205a and 205b when one of the numbers being called is not reachable. In this embodiment, the call routing system 206 optionally uses the cloud media platform 213 when there are restrictions between the carrier's data center and the called party devices 205a and 205b outside the data center. The system 200 disclosed herein comprises the call routing system 206 in communication with the calling party device 201, the called party devices 205a and 205b, and their associated network components 202 and 204 that communicate with each other via the telecommunications network 203, as disclosed in the detailed description of FIG. 2A. The call routing system 206 comprises the carrier media platform 207, the carrier incoming call routing server (ICRS) 208, and an alerting server, for example, the voicemail/missed call alert (MCA) server 209. Furthermore, the call routing system 206 is implemented in a distributed manner comprising the cloud ICRS 210 as disclosed in the detailed description of FIG. 2A. The cloud ICRS 210 communicates with the CRCA 205c over the public data network 212. When the carrier media platform 207 is deployed in the data center of a carrier that places restrictions on data communication between servers deployed inside the carrier's data center and services and devices outside the data center, the call routing system 206 further comprises the cloud media platform 213 deployed on a cloud service platform, for example, AWS® of Amazon Technologies, Inc., or the Google® Cloud platform of Google Inc. In this embodiment, the carrier media platform 207 is deployed inside the carrier's data center and the cloud media platform 213 is deployed outside the carrier's data center in the distributed cloud computing environment for routing the incoming call made to one of multiple numbers of the user, to the CRCA 205c deployed on one or more called party devices 205a and 205b when one of the numbers is not reachable. In an embodiment, there is a single, central cloud media platform 213 that communicates with one or more carrier media platforms 207 deployed in each carrier where the call routing functionality of the method disclosed herein is deployed inside the carrier's data center.

The cloud media platform 213 performs all the functions of the carrier media platform 207 disclosed in the detailed description of FIG. 2A. When the carrier media platform 207 cannot directly communicate with the call receiving client application (CRCA) 205c over the public data network 212, the carrier media platform 207 uses the cloud media platform 213 as a relay to communicate with the CRCA 205c deployed on one or more called party devices 205a and 205b. The communication between the carrier media platform 207 and the cloud media platform 213 is over the secure data network 211, whereas the communication between the cloud media platform 213 and the CRCA 205c is over the public data network 212. Each carrier media platform 207 communicates directly with the CRCA 205c where a security policy of the carrier allows the direct communication, or communicates with the CRCA 205c over the public data network 212 using the cloud media platform 213 as a relay where the carrier's security policy does not permit direct communication with the CRCA 205c.

Figure 2C:
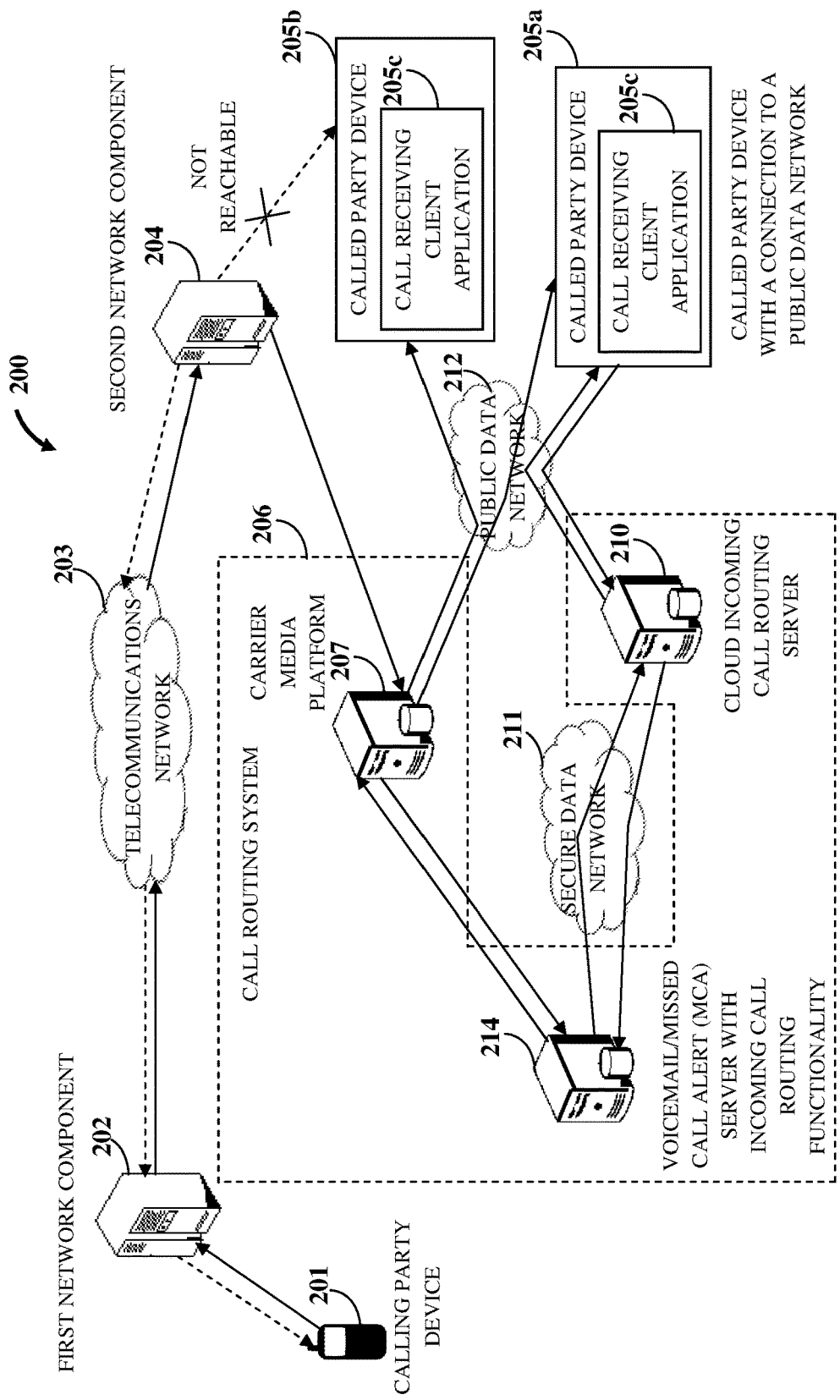
FIG. 2C exemplarily illustrates an embodiment of the system comprising the carrier media platform, a voicemail/missed call alert server with incoming call routing functionality, and a cloud incoming call routing server implemented in a distributed cloud computing environment, for routing an incoming call made to one of multiple numbers of a user, to the call receiving client application deployed on one or more of multiple user devices when one of the numbers being called is not reachable.

FIG. 2C exemplarily illustrates an embodiment of the system 200 comprising the carrier media platform 207, a voicemail/missed call alert (MCA) server 214 with incoming call routing functionality, and the cloud incoming call routing server (ICRS) 210 implemented in a distributed cloud computing environment, for routing an incoming call made to one of multiple numbers of a user, to the call receiving client application (CRCA) 205c deployed on one or more user devices, for example, called party devices 205a and 205b when one of the numbers being called is not reachable. The system 200 disclosed herein comprises the call routing system 206 in communication with the calling party device 201, the called party devices 205a and 205b, and their associated network components 202 and 204 that communicate with each other via the telecommunications network 203, as disclosed in the detailed description of FIG. 2A. The call routing system 206 comprises the carrier media platform 207 and an alerting server, for example, the voicemail/MCA server 214. In this embodiment, the voicemail/MCA server 214 performs the functions of the voicemail/MCA server 209 disclosed in the detailed description of FIG. 2A, and incorporates the functionality of the carrier ICRS 208 exemplarily illustrated in FIG. 2A and as disclosed in the detailed description of FIG. 2A.

In this embodiment, the voicemail/missed call alert (MCA) server 214 with the incoming call routing functionality communicates with the cloud incoming call routing server (ICRS) 210 through the secure data network 211. The cloud ICRS 210 communicates with the call receiving client application (CRCA) 205c on the called party devices 205a and 205b over the public data network 212. The carrier media platform 207 also communicates with the CRCA 205c on the called party devices 205a and 205b over the public data network 212. The carrier media platform 207 routes the incoming call to CRCA 205c on the called party device 205a or 205b via the public data network 212 based on a response received from the carrier ICRS 208. The carrier media platform 207 queries the carrier ICRS 208 to check whether the called party number is "available" to receive the incoming call on the CRCA 205c that is currently registered. If the CRCA 205c is registered, then the carrier media platform 207 communicates with the CRCA 205c directly over the public data network 212. If the CRCA 205c does not answer the incoming call, the carrier media platform 207 redirects the call to the voicemail/MCA server 214. Further, if the response to the query from the carrier ICRS 208 indicates that the CRCA 205c is not registered, then the carrier media platform 207 routes the call to the voicemail/MCA server 214.

Figure 2D:
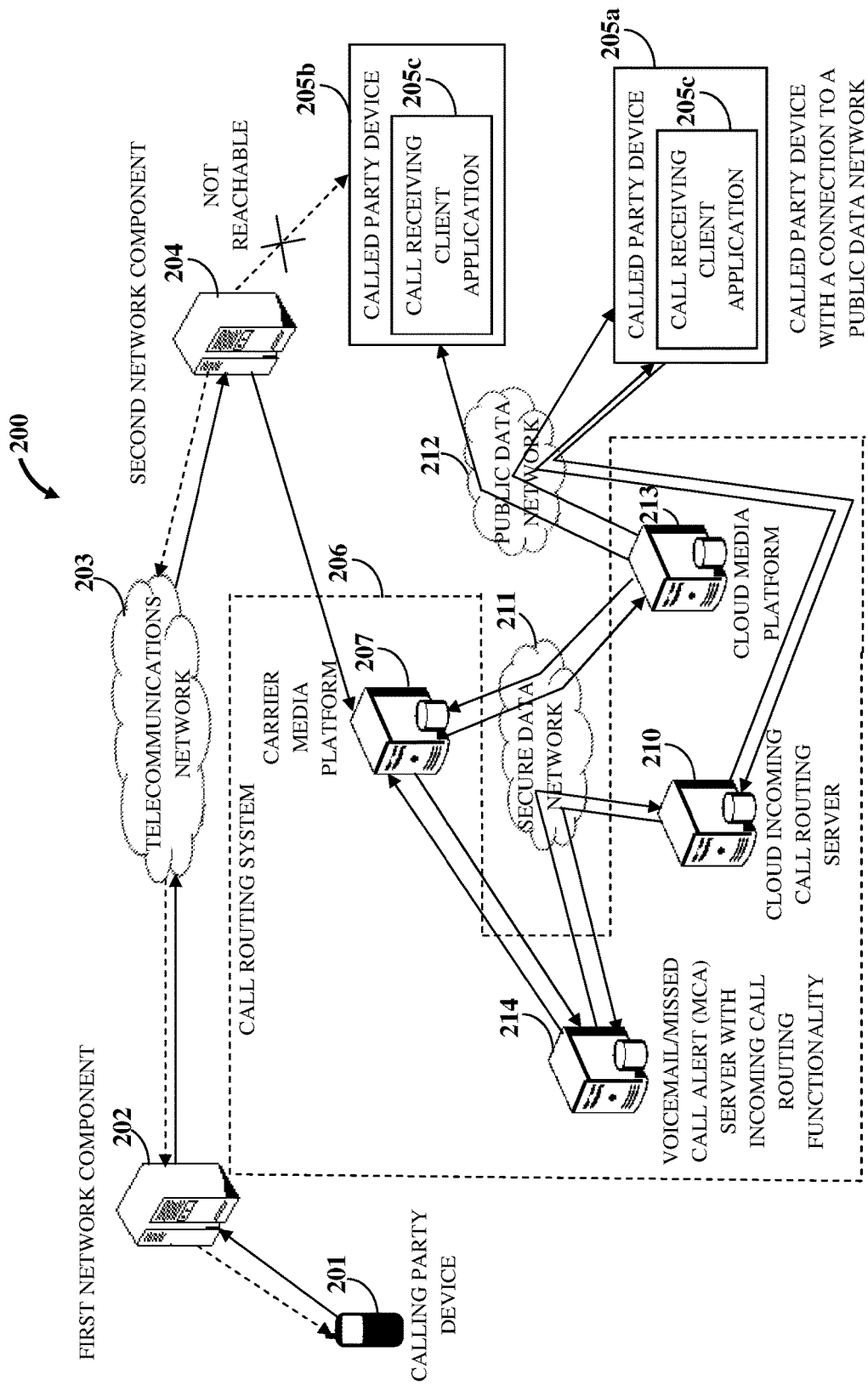
FIG. 2D exemplarily illustrates an embodiment of the system shown in FIG. 2C, further comprising the cloud media platform implemented in a distributed cloud computing environment, for routing an incoming call made to one of multiple numbers of a user, to the call receiving client application deployed on one or more of multiple user devices when one of the numbers being called is not reachable.

FIG. 2D exemplarily illustrates an embodiment of the system 200 shown in FIG. 2C, further comprising the cloud media platform 213 implemented in a distributed cloud computing environment, for routing an incoming call made to one of multiple numbers of a user, to the call receiving client application (CRCA) 205c deployed on one or more user devices, for example, called party devices 205a and 205b when one of the numbers being called is not reachable. In this embodiment, the call routing system 206 optionally uses the cloud media platform 213 when there are restrictions between the carrier's data center and user devices outside the data center. The system 200 disclosed herein comprises the call routing system 206 in communication with the calling party device 201, the called party devices 205a and 205b, and their associated network components 202 and 204 that communicate with each other via the telecommunications network 203, as disclosed in the detailed description of FIG. 2A. In this embodiment, the call routing system 206 comprises the carrier media platform 207, the cloud incoming call routing server (ICRS) 210, and an alerting server, for example, the voicemail/missed call alert (MCA) server 214 with incoming call routing functionality. The voicemail/MCA server 214 with incoming call routing functionality communicates with the cloud ICRS 210 through the secure data network 211. The cloud ICRS 210 communicates with the CRCA 205c on the called party devices 205a and 205b over the public data network 212. The carrier media platform 207 communicates with the cloud media platform 213 through the secure data network 211. In this embodiment, the cloud media platform 213 routes the incoming call to the called party device 205a or 205b via the public data network 212. If the CRCA 205c is registered, then the carrier media platform 207 communicates with the CRCA 205c using the cloud media platform 213 as a relay. If the CRCA 205c does not answer the incoming call, the cloud media platform 213 redirects the call to the voicemail/MCA server 214 via the carrier media platform 207. Further, if the response from the carrier ICRS 208 to the query from the carrier media platform 207 indicates that the CRCA 205c is not registered, then the cloud media platform 213 routes the call to the voicemail/MCA server 214 via the carrier media platform 207. In this embodiment, the carrier media platform 207 cannot communicate with the called party device 205a or 205b over the public data network 212. Therefore, the carrier media platform 207 only communicates with the cloud media platform 213 over the secure data network 211, with the cloud media platform 213 communicating with the CRCA 205c on the called party device 205a or 205b over the public data network 212.

A generic device using a generic program cannot interface instantaneously with the call receiving client application (CRCA) 205c deployed on one or more called party devices 205a and 205b for routing an incoming call made to one of multiple numbers of a user, to the CRCA 205c deployed on one or more called party devices 205a and 205b when one of the numbers is not reachable. In the system 200 disclosed herein as exemplarily illustrated in FIGS. 2A-2D, the call routing system 206 comprising the carrier media platform 207, the carrier incoming call routing server (ICRS) 208, the cloud ICRS 210, the voicemail/MCA server 209, and in different embodiments, the cloud media platform 213 and the voicemail/MCA server 214, interfaces with the CRCA 205c deployed on one or more called party devices 205a and 205b for routing an incoming call made to one of multiple numbers of a user, to the CRCA 205c deployed on one or more called party devices 205a and 205b when one of the numbers is not reachable, and therefore uses more than one specifically programmed computing system.

As exemplarily illustrated in FIGS. 2A-2D, the call routing system 206 disclosed herein provides an improvement in communication technology by implementing a distributed and hybrid architecture that offers a seamless incoming call routing service to users subscribed to multiple carriers in multiple different countries that support different technology and protocols for signaling and communication of audio, and to users with user devices, for example, called party devices 205a and 205b that are manufactured by different vendors and that run different operating systems. The call routing system 206 utilizes different codecs for transmission of audio and uses optimum codecs, with transcoding as needed, to provide an improvement in the audio quality on the incoming call based on the bandwidth available to the user devices. The distributed and hybrid architecture of the call routing system 206 operates with carriers with different security policies that permit or restrict access between servers inside the carrier's data center and the user devices connected over the public data network 212.

Figure 3A:
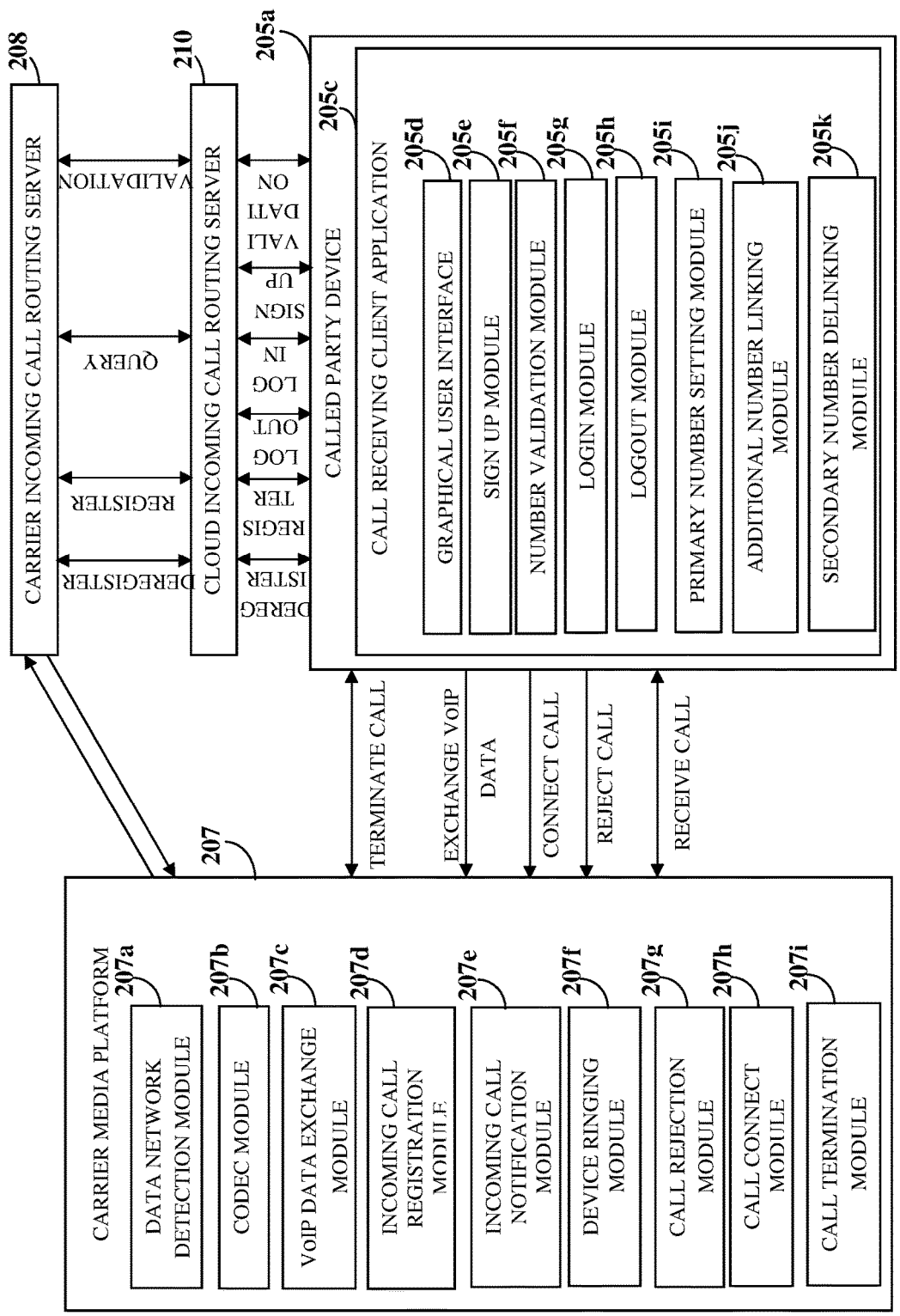
FIG. 3A exemplarily illustrates communication between the carrier incoming call routing server, the cloud incoming call routing server, the carrier media platform, and a called party device for routing an incoming call made to one of multiple numbers of a user, to the call receiving client application deployed on the called party device when one of the numbers being called is not reachable.

FIG. 3A exemplarily illustrates communication between the carrier incoming call routing server (ICRS) 208, the cloud ICRS 210, the carrier media platform 207, and a called party device 205a for routing an incoming call made to one of multiple numbers of a user, to the call receiving client application (CRCA) 205c deployed on the called party device 205a when one of the numbers being called is not reachable. In an embodiment exemplarily illustrated in FIG. 3A, the modules of the CRCA 205c of the called party device 205a communicate with the carrier media platform 207 and the cloud ICRS 210. The CRCA 205c for receiving incoming calls and missed calls is installed on the called party device 205a. The CRCA 205c comprises a graphical user interface (GUI) 205d, a sign up module 205e, a number validation module 205f, a login module 205g, a logout module 205h, a primary number setting module 205i, an additional number linking module 205j, and a secondary number delinking module 205k. The GUI 205d allows the user to interact with the called party device 205a and provide input to the CRCA 205c on the called party device 205a. The sign up module 205e allows the user of the called party device 205a to sign up the CRCA 205c with the cloud ICRS 210 by setting up a user account on receiving the numbers owned by the user. The number validation module 205f communicates with the carrier ICRS 208 and the cloud ICRS 210 to allow the cloud ICRS 210 to validate the numbers of the called party device 205a through one or more authentication mechanisms as disclosed in the detailed description of FIG. 1. The login module 205g and the logout module 205h allow the user to login to the CRCA 205c and logout from the CRCA 205c respectively. The primary number setting module 205i sets a primary number for the user account. The additional number linking module 205j links additional numbers owned by the user to the same user account. The secondary number delinking module 205k delinks each of the linked additional numbers from the user account.

The cloud incoming call routing server (ICRS) 210 communicates with the call receiving client application (CRCA) 205c on the called party device 205a over the public data network 212 as exemplarily illustrated in FIG. 2A. The CRCA 205c communicates with the cloud ICRS 210 to indicate the following actions, for example, validation, sign up, login, logout, register, and deregister using the modules 205f, 205e, 205g, 205h, 205i, 205j, and 205k of the CRCA 205c disclosed above. The cloud ICRS 210 receives sign up, validation, login, logout, register, and deregister commands from the CRCA 205c via the public data network 212. The carrier media platform 207 communicates with the CRCA 205c using one of multiple voice over internet protocols (VoIPs). In an embodiment, the carrier media platform 207 communicates with CRCA 205c using inter-asterisk eXchange version 2 (IAX2) protocol for both signaling and media. In another embodiment, the carrier media platform 207 communicates with the CRCA 205c using a session initiation protocol (SIP) for signaling and a real-time transport protocol (RTP) in conjunction with a real-time transport control protocol (RTCP) for media. To use the SIP in networks where there are barriers between the carrier media platform 207 and the CRCA 205c due to network address translators (NATs) or firewalls, the carrier media platform 207 and the CRCA 205c employ the interactive connectivity establishment (ICE) protocol. The ICE protocol in turn uses protocols comprising, for example, session transversal utilities for NAT (STUN) and traversal using relays around NAT (TURN).

The cloud incoming call routing server (ICRS) 210 communicates with the carrier ICRS 208 over the secure data network 211 as exemplarily illustrated in FIG. 2A. The carrier ICRS 208 further communicates with the carrier media platform 207. The cloud ICRS 210 relays queries and validation, register, and deregister commands to the carrier ICRS 208. Given the heterogeneous nature of different telecom carriers' networks, the carrier media platform 207 and the carrier ICRS 208 communicate with the carrier's mobile switching center (MSC) or a mobile soft switch (MSS) using one of multiple protocols. In an embodiment, the carrier media platform 207 uses session initiation protocol (SIP) for signaling and real-time transport protocol (RTP) in conjunction with real-time transport control protocol (RTCP) for media to communicate with the MSC. In another embodiment, the carrier media platform 207 communicates with the MSC using an integrated services digital network (ISDN) user part (ISUP) over a signaling system no. 7 (SS7) for signaling and time division multiplexing (TDM) channels or synchronous digital hierarchy (SDH) channels, for example, synchronous transport module level-1 (STM-1) for media. The TDM channels comprise, for example, T-carrier channels such as T1, T3, etc., E-carrier channels such as E1, E2, etc. In another embodiment, the carrier media platform 207 communicates with the MSC using the ISUP over SIGTRAN in place of the ISUP over SS7 for signaling, with protocols, for example, E1, T1, and STM-1 for media. "SIGTRAN" derived from signaling transport is a telephony protocol used to transport SS7 signals over the internet. SIGTRAN defines specifications for protocols that provide a reliable datagram service and user layer adaptations for SS7 and ISDN communication protocols.

In an embodiment, the carrier media platform 207 comprises a data network detection module 207a, a codec module 207b, a voice over internet protocol (VoIP) data exchange module 207c, an incoming call registration module 207d, an incoming call notification module 207e, a device ringing module 207f, a call rejection module 207g, a call connect module 207h, and a call termination module 207i. The data network detection module 207a detects the availability of the public data network 212 for communicating with the call receiving client application (CRCA) 205c of the called party device 205a exemplarily illustrated in FIG. 2A, to route the incoming call. The codec module 207b compresses and decompresses digital audio data in accordance with a predefined audio file streaming coding format. The codec module 207b selects an optimum codec for communicating with the CRCA 205c on the called party device 205a based on available bandwidth between the carrier media platform 207 and the CRCA 205c. The codec module 207b also implements transcoding for converting a codec used for communication between a network component, for example, the carrier's mobile switching center (MSC) or the mobile soft switch (MSS) and the carrier media platform 207 to the optimum codec used for communication between the carrier media platform 207 and the CRCA 205c.

The carrier media platform 207 supports multiple codecs comprising, for example, G.711a, G.711u, G.729, SILK® of Skype Corporation, and the Opus open standard codec, for communicating with the carrier's mobile switching center (MSC) or the mobile soft switch (MSS). During a session establishment phase, also referred as a call connection phase, the codec module 207b of the carrier media platform 207 negotiates the codec to be used for an incoming call based on a common set of codecs supported by the carrier media platform 207 and the MSC/MSS. The codec module 207b uses the most optimal codec that provides the audio quality required for the call. Similarly, the carrier media platform 207 supports multiple codecs comprising, for example, G.711a, G.711u, G.729, SILK®, and Opus, for communicating with the call receiving client application (CRCA) 205c. During the session establishment phase, the codec module 207b negotiates the codec to be used for an incoming call based on the common set of codecs supported by the carrier media platform 207 and the CRCA 205c. The codec module 207b uses the codec that uses data bandwidth less than or equal to the available bandwidth while providing an improvement in the audio quality for the call. In an embodiment, the codec module 207b uses a different codec for communication between the carrier media platform 207 and the CRCA 205c from the codec used between the carrier media platform 207 and the MSC/MSS. In this embodiment, the codec module 207b implements transcoding between the two codecs used for communicating with the MSC/MSS and with the CRCA 205c.

The voice over internet protocol (VoIP) data exchange module 207c exchanges data over VoIP between the carrier media platform 207 and the call receiving client application (CRCA) 205c on the called party device 205a. The incoming call registration module 207d receives the incoming call made to one of the numbers, when that number is not reachable. The incoming call registration module 207d receives the incoming call made to one of the numbers forwarded by the carrier via a routing number, when that number is not reachable, and determines whether one of the numbers is linked to the user account set up by the cloud incoming call routing server (ICRS) 210 to route the incoming call to the CRCA 205c on the calling party device 205a over the public data network 212. The incoming call notification module 207e transmits a notification of the incoming call to the CRCA 205c on the called party device 205a. The device ringing module 207f monitors the progress of the incoming call to receive an indication of the call successfully reaching the CRCA 205c, for example, a ringtone of the called party device 205a that indicates that the called party device 205a is ringing, etc. The call rejection module 207g detects rejection of the incoming call by the user of the called party device 205a. The call connect module 207h detects connection of the incoming call to the called party device 205a when the user accepts the incoming call. The call termination module 207i terminates the incoming call if the incoming call is not answered for a preconfigured period of time.

Figure 3B:
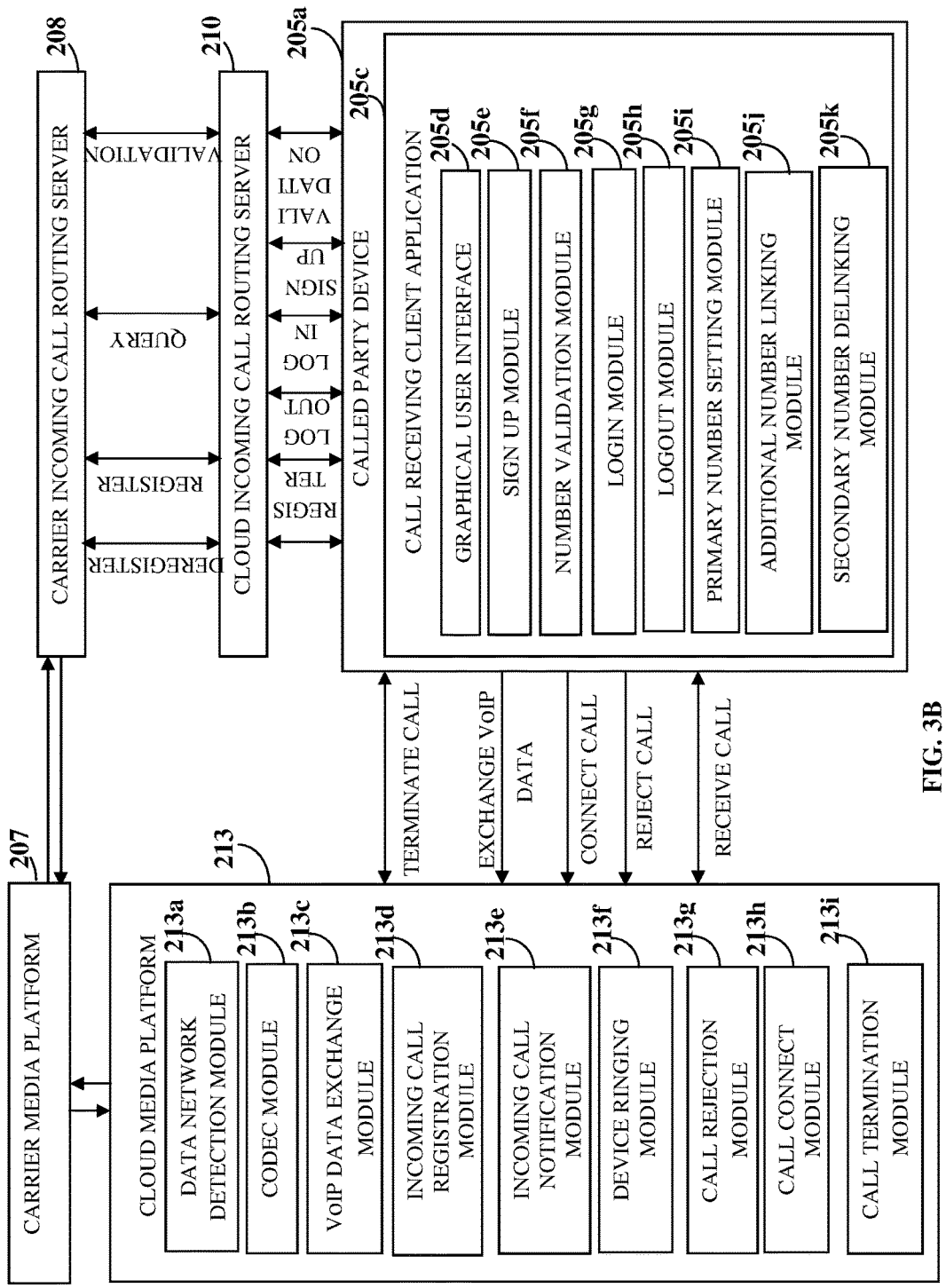
FIG. 3B exemplarily illustrates an embodiment showing communication between the carrier incoming call routing server, the cloud incoming call routing server, the carrier media platform, the cloud media platform, and a called party device for routing an incoming call made to one of multiple numbers of a user, to the call receiving client application deployed on the called party device when one of the numbers being called is not reachable.

FIG. 3B exemplarily illustrates an embodiment showing communication between the carrier incoming call routing server (ICRS) 208, the cloud ICRS 210, the carrier media platform 207, the cloud media platform 213, and a called party device 205a for routing an incoming call made to one of multiple numbers of a user, to the call receiving client application (CRCA) 205c deployed on the called party device 205a when one of the numbers being called is not reachable. The cloud ICRS 210 communicates with the CRCA 205c on the called party device 205a over the public data network 212 exemplarily illustrated in FIG. 2A and as disclosed in the detailed description of FIG. 3A. The cloud ICRS 210 further communicates with the carrier ICRS 208 over the secure data network 211 exemplarily illustrated in FIG. 2A and as disclosed in the detailed description of FIG. 3A. The carrier ICRS 208 communicates with the carrier media platform 207. In this embodiment, the carrier media platform 207 communicates with the cloud media platform 213 over the secure data network 211. The carrier media platform 207 communicates with the cloud media platform 213 that functions as a relay and communicates with the CRCA 205c on the called party device 205a when the carrier media platform 207 cannot communicate directly with the CRCA 205c. In this embodiment, the cloud media platform 213 comprises a data network detection module 213a, a codec module 213b, a voice over internet protocol (VoIP) data exchange module 213c, an incoming call registration module 213d, an incoming call notification module 213e, a device ringing module 213f, a call rejection module 213g, a call connect module 213h, and a call termination module 213i. The functions of the modules 213a, 213b, 213c, 213d, 213e, 213f, 213g, 213h, and 213i of the cloud media platform 213 is similar to the functions of the modules 207a, 207b, 207c, 207d, 207e, 207f, 207g, 207h, and 207i of the carrier media platform 207 respectively, disclosed in the detailed description of FIG. 3A. The CRCA 205c comprising the graphical user interface (GUI) 205d, the sign up module 205e, the number validation module 205f, the login module 205g, the logout module 205h, the primary number setting module 205i, the additional number linking module 205j, and the secondary number delinking module 205k disclosed in the detailed description of FIG. 3A, communicates with the cloud media platform 213 and the cloud ICRS 210 via the public data network 212.

In this embodiment where the carrier places restrictions on data communication between servers deployed inside the carrier's data center and services and devices outside the data center, the carrier media platform 207 and the cloud media platform 213 communicate with the CRCA 205c using one of multiple voice over internet protocols (VoIPs). In an embodiment, the carrier media platform 207 and the cloud media platform 213 communicate with the CRCA 205c using an inter-asterisk eXchange Version 2 (IAX2) protocol for both signaling and media. In another embodiment, the carrier media platform 207 and the cloud media platform 213 communicate with the CRCA 205c using a session initiation protocol (SIP) for signaling and a real-time transport protocol (RTP) in conjunction with a real-time transport control protocol (RTCP) for media. To use the SIP in networks where there are barriers between the cloud media platform 213 and the CRCA 205c due to network address translators (NATs) or firewalls, the cloud media platform 213 and the CRCA 205c employ the interactive connectivity establishment (ICE) protocol disclosed in the detailed description of FIG. 3A.

Figure 4A:
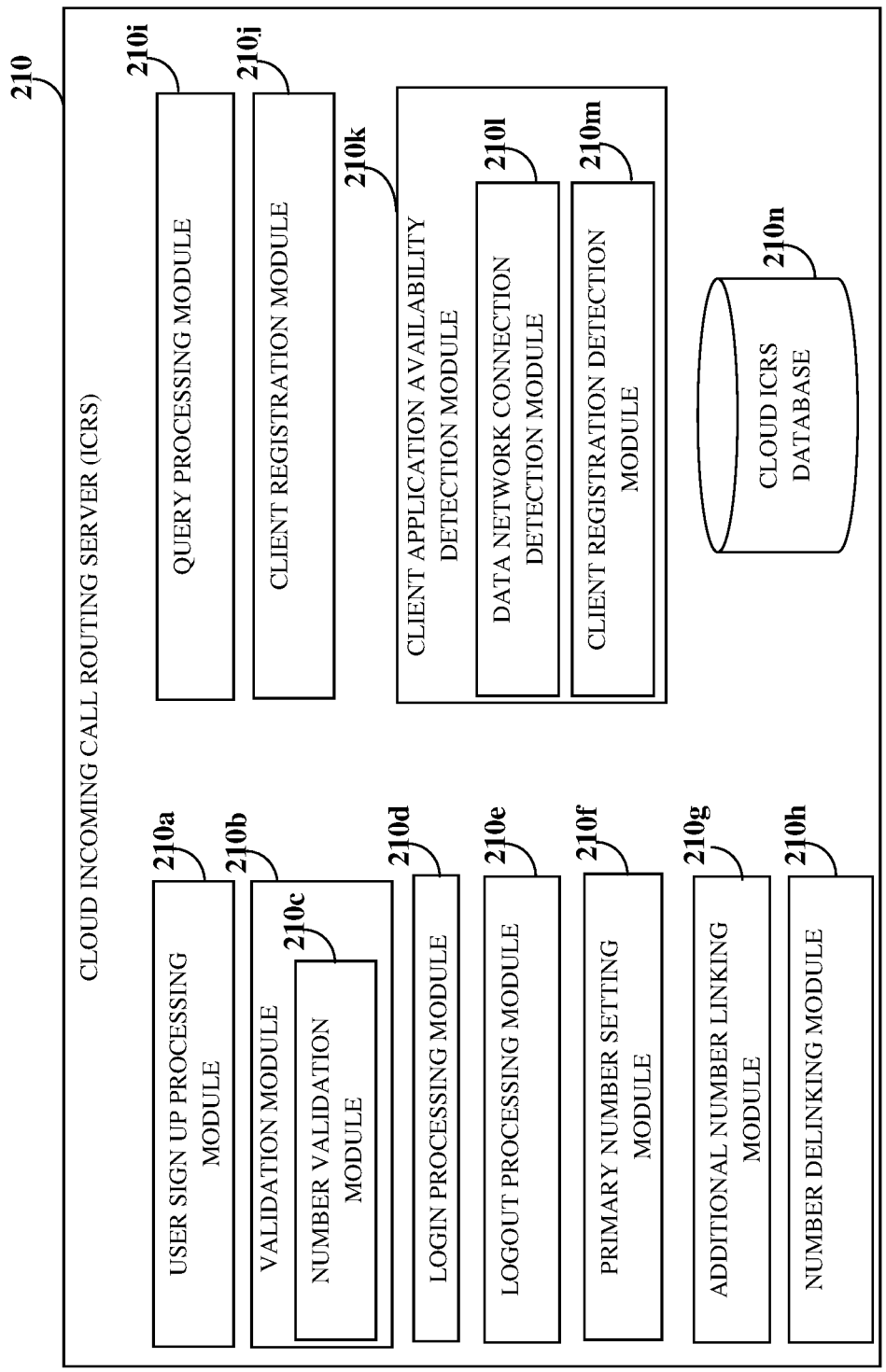
FIG. 4A exemplarily illustrates modules of the cloud incoming call routing server used for routing an incoming call made to one of multiple numbers of a user, to the call receiving client application deployed on one or more of multiple user devices when one of the numbers being called is not reachable.

FIG. 4A exemplarily illustrates modules of the cloud incoming call routing server (ICRS) 210 used for routing an incoming call made to one of multiple numbers of a user, to the call receiving client application (CRCA) 205c deployed on one or more user devices, for example, the called party devices 205a and 205b exemplarily illustrated in FIGS. 2A-2B, when one of the numbers being called is not reachable. In an embodiment, the cloud ICRS 210 comprises a user sign up processing module 210a, a validation module 210b, a login processing module 210d, a logout processing module 210e, a primary number setting module 210f, an additional number linking module 210g, a number delinking module 210h, a query processing module 210i, a client registration module 210j, a client application availability detection module 210k, and a cloud ICRS database 210n. The user sign up processing module 210a sets up a user account for the user using one or more of multiple numbers of the user in communication with the CRCA 205c deployed on one or more user devices. The user sign up processing module 210a sets a password for logging into the CRCA 205c deployed on one or more user devices with one or more numbers of the user. The user sign up processing module 210a receives a request from user to sign up with the cloud ICRS 210 from one of the user devices and processes the request.

The validation module 210b comprises a number validation module 210c for validating one or more numbers received from the user, through one or more of the authentication mechanisms disclosed in the detailed description of FIG. 1. The validation module 210b in the cloud incoming call routing server (ICRS) 210, in communication with a validation module 208a in the carrier ICRS 208 exemplarily illustrated in FIG. 4B, validates the numbers of the user through one or more of multiple authentication mechanisms. The number validation module 210c in the cloud ICRS 210 transmits a validation code request to the validation module 208a of the carrier ICRS 208 over the secure data network 211 exemplarily illustrated in FIGS. 2A-2B. In an embodiment, the validation module 208a of the carrier ICRS 208 comprises a validation code communication module 208b for transmitting a validation code to each of the numbers of the user to be validated by the validation module 210b of the cloud ICRS 210, for example, via a short message service (SMS) message or an outbound dialing call initiated by the validation code communication module 208b. The number validation module 210c in the cloud ICRS 210 receives an input code captured by the call receiving client application (CRCA) 205c from one of the user devices and the validation code from the validation code communication module 208b in the carrier ICRS 208, and matches the received input code with the validation code transmitted by the validation code communication module 208b of the carrier ICRS 208. In another embodiment, the validation code communication module 208b in the carrier ICRS 208 sends a message to each of the numbers of the user to be validated, and the number validation module 210c in the cloud ICRS 210 receives a confirmation from the CRCA 205c that the sent message is received on one of the user devices indicating that one of the user devices contains a subscriber identity module with one of the numbers of the user to be validated. In another embodiment, the number validation module 210c in the cloud ICRS 210 receives a message sent from the CRCA 205c on one of the user devices to a predetermined number and matches a source number of the message with one of the numbers of the user to be validated. In another embodiment, the number validation module 210c in the cloud ICRS 210 receives a missed call placed by the CRCA 205c on one of the user devices to a predefined number and matches a source number of the missed call with one of the numbers of the user to be validated.

The login processing module 210d and the logout processing module 210e process a login request and a logout request respectively, from one of the user devices. The login processing module 210d communicates with the login module 205g of the call receiving client application (CRCA) 205c exemplarily illustrated in FIG. 3A, to process a login request of the user to login to the CRCA 205c on the called party device 205a exemplarily illustrated in FIG. 3A, and register the CRCA 205c. The logout processing module 210e communicates with the logout module 205h of the CRCA 205c exemplarily illustrated in FIG. 3A, to process a logout request of the user to logout of the CRCA 205c on the called party device 205a and deregister the CRCA 205c. The primary number setting module 210f, in communication with the primary number setting module 205i of the CRCA 205c exemplarily illustrated in FIGS. 3A-3B, sets the primary number for the user account and updates the primary number with a new number before delinking the first set primary number. The additional number linking module 210g, in communication with the additional number linking module 205j of the CRCA 205c exemplarily illustrated in FIGS. 3A-3B, links additional numbers of the user to the same user account. The number delinking module 210h, in communication with the secondary number delinking module 205k of the CRCA 205c exemplarily illustrated in FIGS. 3A-3B, delinks one or more numbers of the user from the user account. The number delinking module 210h also delinks the primary number from the user account only after assigning a new number as the primary number for the user account.

The query processing module 210i receives, processes, and relays queries from the call receiving client application (CRCA) 205c deployed on one or more user devices to the carrier incoming call routing server (ICRS) 208. The query processing module 210i also responds to queries from the carrier ICRS 208. The client registration module 210j communicates with the login processing module 210d to determine login and registration of the CRCA 205c. The client registration module 210j, in communication with the login processing module 210d, registers the CRCA 205c deployed on one or more user devices. The client registration module 210j processes the client registration request and adds user devices with the registered CRCA 205c and the registered one or more numbers to the cloud ICRS database 210n. The client registration module 210j also communicates with the logout processing module 210e to determine logout and deregistration of the CRCA 205c. The client registration module 210j processes the client deregistration request from the user. The client registration module 210j removes a user device with a deregistered CRCA 205c from the cloud ICRS database 210n. The client registration module 210j updates the user devices with the registered CRCA 205c and the associated numbers in the cloud ICRS database 210n and invokes the user account when the user adds a new number or delinks a number from the user account.

The client application availability detection module 210k detects availability of the call receiving client application (CRCA) 205c on one or more user devices over the public data network 212 to accept an incoming call. In an embodiment, the client application availability detection module 210k comprises a data network connection detection module 210l and a client registration detection module 210m. The data network connection detection module 210l detects a connection of the CRCA 205c to the public data network 212. The client registration detection module 210m, in communication with the client registration module 210j, detects registration of the CRCA 205c on one or more user devices, and deregistration of the CRCA 205c on one or more user devices. The client registration detection module 210m detects a user device with a deregistered CRCA 205c. In an embodiment, the client registration module 210j stores a registration status of the CRCA 205c on one or more user devices in the cloud ICRS database 210n. The registration status indicates whether the user devices have data connectivity or a connection to the public data network 212, and whether the user has logged into the CRCA 205c on the user devices. The client registration module 210j also transmits the registration status of the CRCA 205c on one or more user devices associated with a called number to the carrier ICRS 208.

Figure 4B:
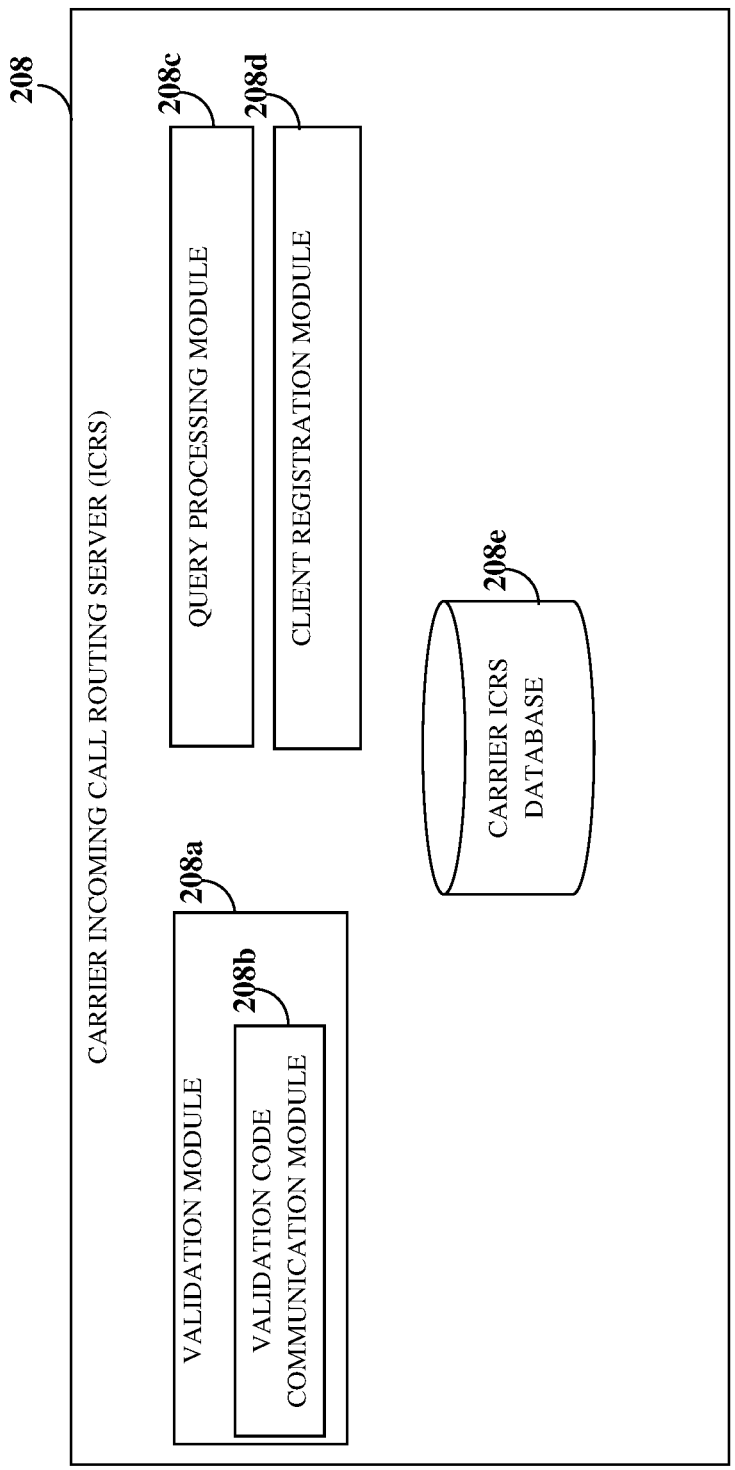
FIG. 4B exemplarily illustrates modules of the carrier incoming call routing server used for routing an incoming call made to one of multiple numbers of a user, to the call receiving client application deployed on one or more of multiple user devices when one of the numbers being called is not reachable.

FIG. 4B exemplarily illustrates modules of the carrier incoming call routing server (ICRS) 208 used for routing an incoming call made to one of multiple numbers of a user, to the call receiving client application (CRCA) 205c deployed on one or more user devices when one of the numbers being called is not reachable. The carrier ICRS 208 comprises the validation module 208a, a query processing module 208c, a client registration module 208d, and a carrier ICRS database 208e. The validation module 208a in the carrier ICRS 208 comprises the validation code communication module 208b for sending a validation code, for example, by a short message service (SMS) or by outbound dialing (OBD) or by an interactive voice response (IVR) to the CRCA 205c deployed on one or more user devices to allow the number validation module 210c in the cloud ICRS 210 exemplarily illustrated in FIG. 4A, to validate the numbers of the user. The validation code communication module 208b also sends the validation code to the cloud ICRS 210 to allow the number validation module 210c in the cloud ICRS 210 to match the validation code with the input code sent by the CRCA 205c on one or more user devices to the carrier ICRS 208. The query processing module 208c responds to queries from the carrier media platform 207, and if required sends the queries to the cloud ICRS 210. The query processing module 208c receives and processes the queries from the carrier media platform 207 on whether the CRCA 205c is registered on one or more user devices. The client registration module 208d in the carrier ICRS 208 receives the registration status of the CRCA 205c on one or more user devices associated with a called number from the client registration module 210j of the cloud ICRS 210 exemplarily illustrated in FIG. 4A, and stores the registration status in the carrier ICRS database 208e. The client registration module 208d in the carrier ICRS 208 also receives registration information and deregistration information from the client registration module 210j in the cloud ICRS 210 and stores the registration information and the deregistration information in the carrier ICRS database 208e. The query processing module 208c queries the carrier ICRS database 208e and sends a response, for example, "available with an address" or "not available" to the carrier media platform 207. In addition to the registration information and the deregistration information, the carrier ICRS database 208e stores user accounts associated with one or more user devices and one or more numbers of the user associated with each of the user accounts.

Figure 5A:
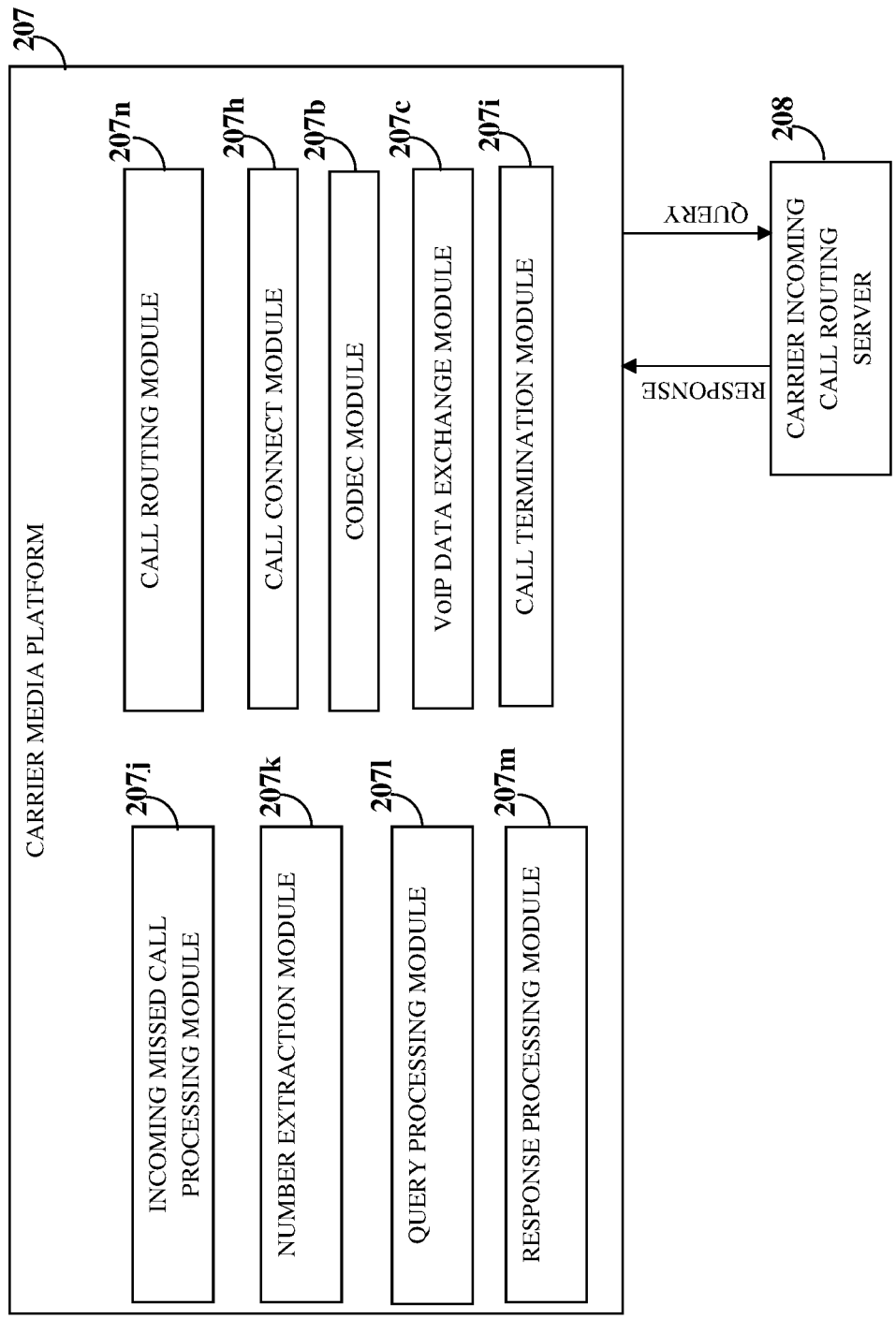
FIG. 5A exemplarily illustrates communication between the carrier incoming call routing server and the carrier media platform for routing an incoming call made to one of multiple numbers of a user, to the call receiving client application deployed on one or more of multiple user devices when one of the numbers being called is not reachable.

FIG. 5A exemplarily illustrates communication between the carrier incoming call routing server (ICRS) 208 and the carrier media platform 207 for routing an incoming call made to one of multiple numbers of a user, to the call receiving client application (CRCA) 205c deployed on one or more user devices, when one of the numbers being called is not reachable. In an embodiment, the carrier media platform 207 comprises an incoming missed call processing module 207j, a number extraction module 207k, a query processing module 207l, a response processing module 207m, a call routing module 207n, the call connect module 207h, the codec module 207b, the voice over internet protocol (VoIP) data exchange module 207c, and the call termination module 207i. The carrier media platform 207 queries and receives responses from the carrier ICRS 208. The incoming missed call processing module 207j processes the incoming missed call for routing to an available CRCA 205c. The number extraction module 207k extracts the number of the calling party and the user's number, that is, the called party number. The query processing module 207l queries the carrier ICRS 208 and the response processing module 207m processes responses from the carrier ICRS 208 as disclosed in the detailed description of FIG. 2A. The query processing module 207l queries the carrier ICRS 208 to determine availability of the CRCA 205c deployed on one or more user devices associated with the called party number, that is, to determine whether the CRCA 205c deployed on one or more user devices has data connectivity or a connection to the public data network 212, and whether the user has logged into the CRCA 205c on one or more user devices. The response processing module 207m receives and processes the response, for example, "available with an address" or "not available" received from the carrier ICRS 208.

The call routing module 207n routes the incoming call to the call receiving client application (CRCA) 205c on one or more user devices over the public data network 212 exemplarily illustrated in FIG. 2A, on detecting the availability of the CRCA 205c on one or more user devices over the public data network 212. The call routing module 207n also routes the incoming call to the voicemail/missed call alert (MCA) server 209 exemplarily illustrated in FIG. 2A, if the incoming call is unanswered for a predetermined period of time by any of the user devices. The call routing module 207n also routes the received incoming call to the voicemail/MCA server 209 if the incoming call is not accepted for a preconfigured period of time from any of one or more user devices. The call routing module 207n also routes the received incoming call to the voicemail/MCA server 209 on detecting an unavailability of the CRCA 205c on each of the user devices. The response processing module 207m processes the response from the CRCA 205c. The call connect module 207h, the codec module 207b, the voice over internet protocol (VoIP) data exchange module 207c, and the call termination module 207i performs the functions disclosed in the detailed description of FIG. 3A.

Figure 5B:
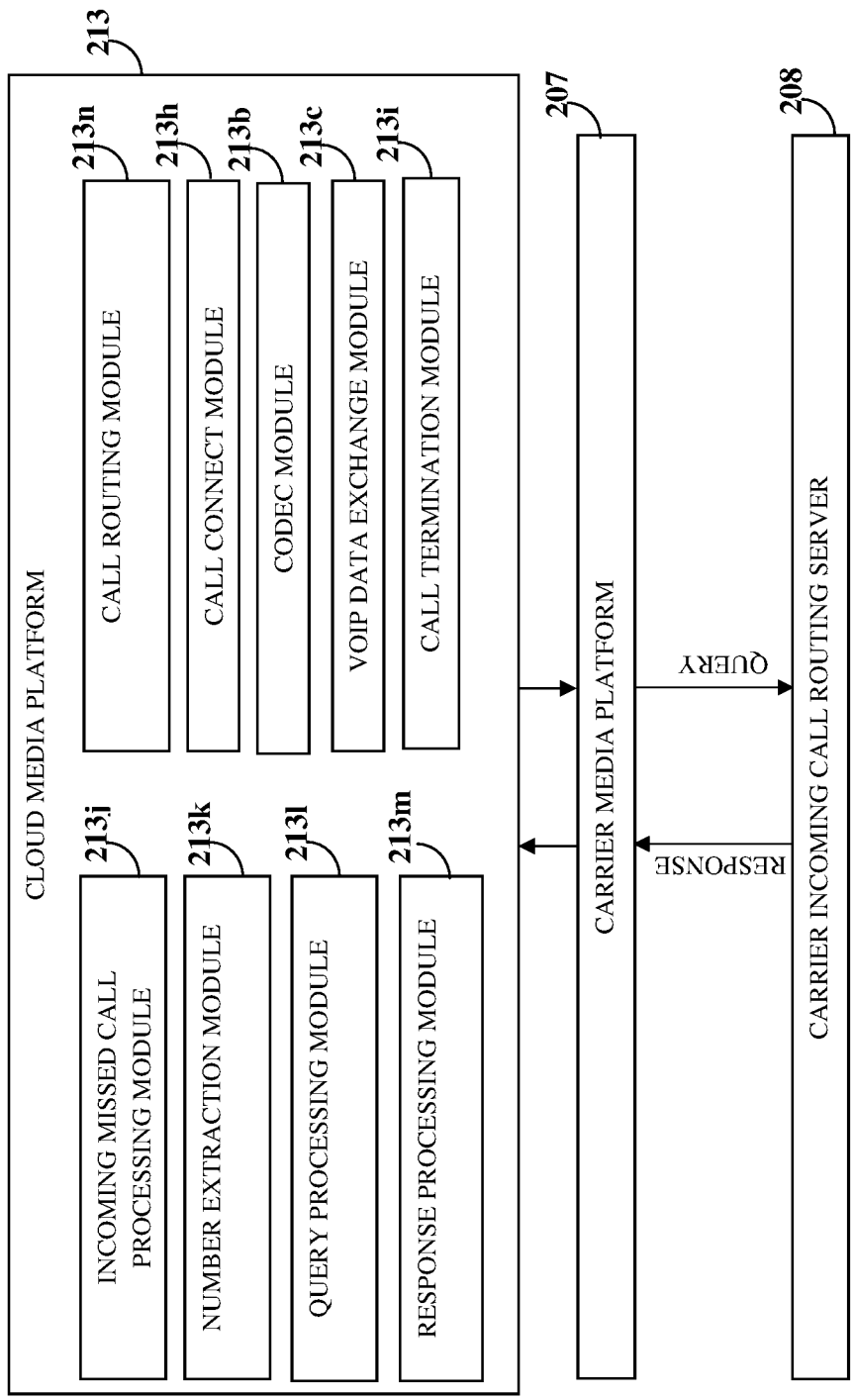
FIG. 5B exemplarily illustrates communication between the carrier incoming call routing server, the carrier media platform, and the cloud media platform for routing an incoming call made to one of multiple numbers of a user, to the call receiving client application deployed on one or more of multiple user devices when one of the numbers being called is not reachable.

FIG. 5B exemplarily illustrates communication between the carrier incoming call routing server (ICRS) 208, the carrier media platform 207, and the cloud media platform 213 for routing an incoming call made to one of multiple numbers of a user, to the call receiving client application (CRCA) 205c deployed on one or more of multiple user devices when one of the numbers being called is not reachable. The carrier media platform 207 queries the carrier ICRS 208 regarding registration of the CRCA 205c deployed on one or more user devices and receives and processes responses from the carrier ICRS 208 as disclosed in the detailed description of FIG. 5A. The carrier media platform 207 communicates with the cloud media platform 213 via the secure data network 211 as exemplarily illustrated in FIG. 2B. In an embodiment, the cloud media platform 213 comprises an incoming missed call processing module 213j, a number extraction module 213k, a query processing module 213l, a response processing module 213m, a call routing module 213n, the call connect module 213h, the codec module 213b, the voice over internet protocol (VoIP) data exchange module 213c, and the call termination module 213i. The functions of the modules 213j, 213k, 213l, 213m, 213n, 213h, 213b, 213c, and 213i of the cloud media platform 213 is similar to the functions of the modules 207j, 207k, 207l, 207m, 207n, 207h, 207b, 207c, and 207i of the carrier media platform 207 respectively, as disclosed in the detailed description of FIG. 5A. When the modules 207j, 207k, 207l, 207m, 207n, 207h, 207b, 207c, and 207i of the carrier media platform 207 cannot directly communicate with the CRCA 205c over a public data network 212 exemplarily illustrated in FIG. 2B, the carrier media platform 207 uses the modules 213j, 213k, 213l, 213*m*, 213*n*, 213*h*, 213*b*, 213*c*, and 213*i* of the cloud media platform 213 as a relay to communicate with the CRCA 205*c*. Based on the response received from the carrier ICRS 208, the call routing module 213*n* of the cloud media platform 213 routes the incoming call to the CRCA 205*c* deployed on one or more user devices over the public data network 212, when the incoming call is made to one of the numbers associated with a carrier that does not permit direct data communication between servers in the public data network 212 of the carrier and the user devices.

Figure 6A:
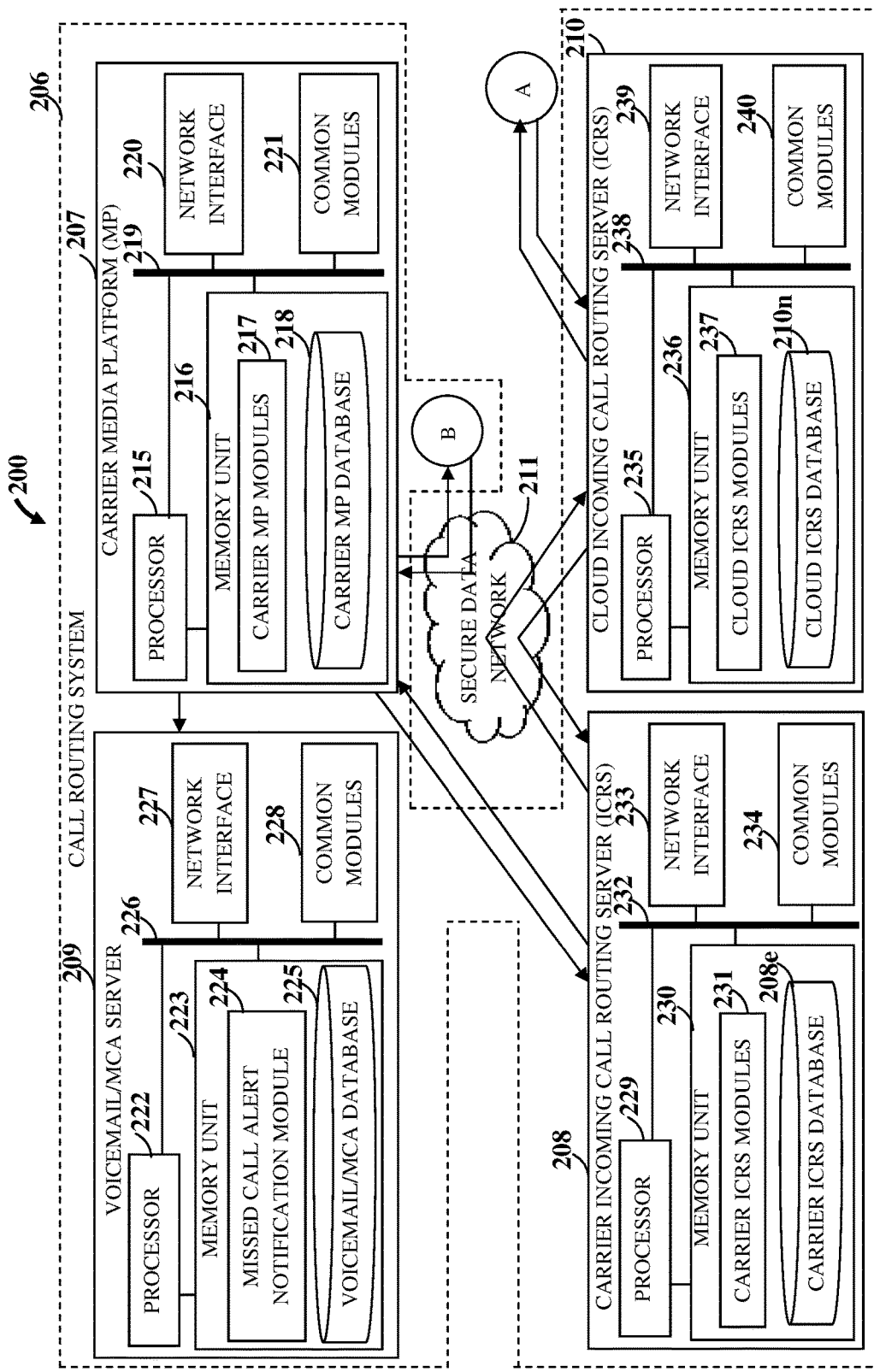
FIGS. 6A-6B exemplarily illustrate an architectural diagram of the system for routing an incoming call made to one of multiple numbers of a user, to the call receiving client application deployed on one or more of multiple user devices when one of the numbers being called is not reachable.
Figure 6B:
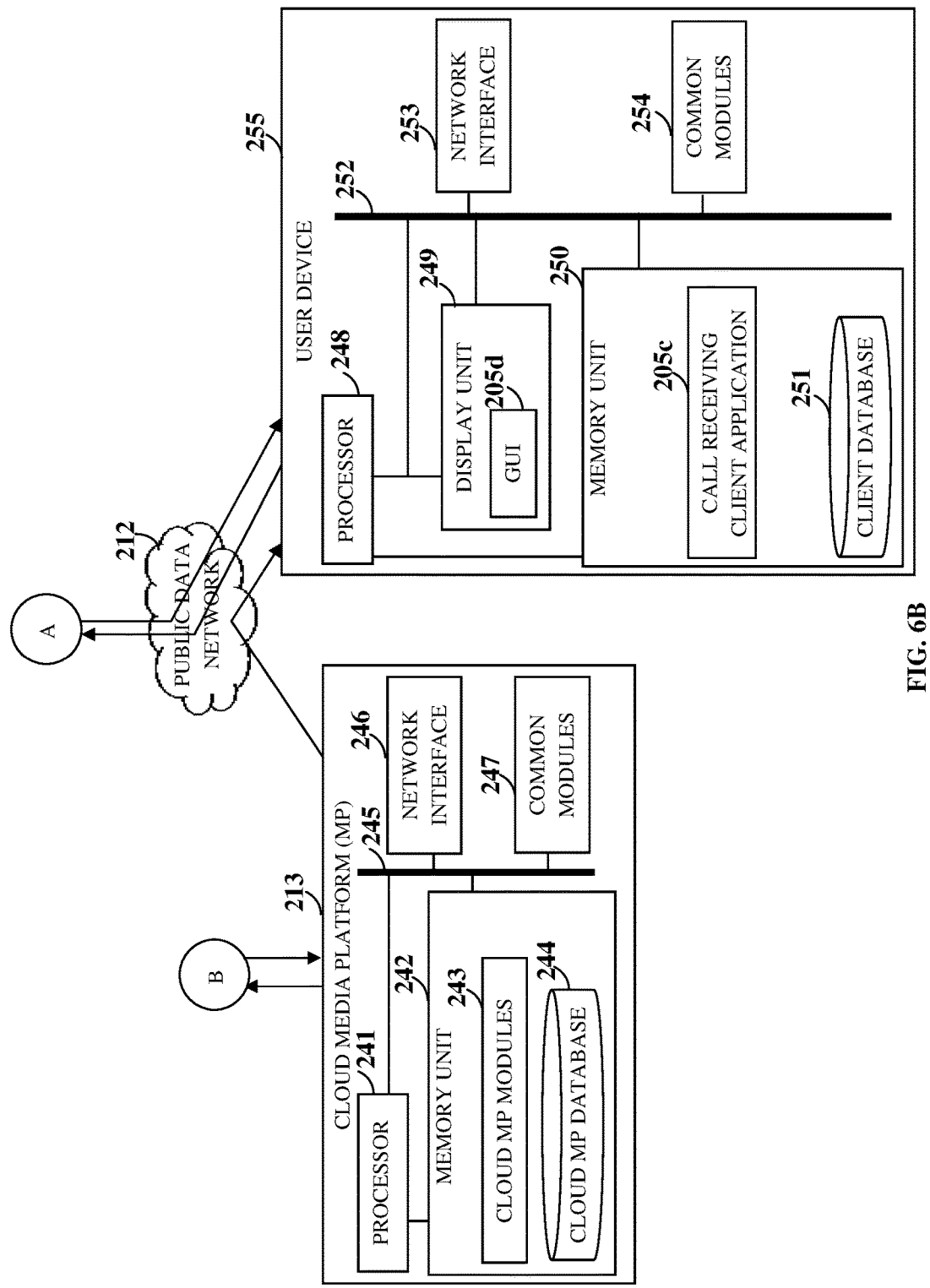

FIGS. 6A-6B exemplarily illustrates an architectural diagram of the system 200 for routing an incoming call made to one of multiple numbers of a user, to the call receiving client application (CRCA) 205*c* deployed on one or more of multiple user devices, for example, a user device 255, when one of the numbers being called is not reachable. The system 200 disclosed herein comprises the call routing system 206 in communication with the CRCA 205*c* on the user device 255 via a public data network 212, for example, a short range network or a long range network. The user device 255 is an electronic device, for example, one of a personal computer, a tablet computing device, a mobile computer, a mobile phone, a smartphone, a portable computing device, a personal digital assistant, a laptop, a wearable computing device such as the Google Glass® of Google Inc., the Apple Watch® of Apple Inc., etc., a touch centric device, a client device, a portable electronic device, a network enabled computing device, an interactive network enabled communication device, a gaming device, an image capture device, any other suitable computing equipment, combinations of multiple pieces of computing equipment, etc. In an embodiment, the user device 255 is a hybrid computing device that combines the functionality of multiple devices. Examples of a hybrid computing device comprise a cellular telephone that includes a media player functionality, a gaming device that includes a wireless communications capability, a cellular telephone that includes game and multimedia functions, and a portable device that receives electronic mail (email), supports mobile telephone calls, has a media player functionality, and supports web browsing. In an embodiment, computing equipment is used to implement applications such as media playback applications, for example, a web browser, an electronic mail (email) application, a calendar application, etc.

The user device 255 and other user devices owned by the user and deploying the call receiving client application (CRCA) 205*c* run a single operating system or different operating systems. The user device 255 and other user devices are manufactured by a single vendor or different vendors. In an embodiment, the call routing system 206 comprises the carrier media platform 207, the carrier incoming call routing server (ICRS) 208, the cloud ICRS 210, the alerting server, for example, the voicemail/missed call alert (MCA) server 209, and in an embodiment, the cloud media platform 213 as disclosed in the detailed description of FIGS. 2A-2B. In another embodiment, the carrier ICRS 208 and the voicemail/MCA server 209 are combined into a single voicemail/MCA server 214 with incoming call routing functionality as disclosed in the detailed description of FIGS. 2C-2D.

The user device 255, the carrier incoming call routing server (ICRS) 208, the cloud ICRS 210, the carrier media platform 207, the cloud media platform 213, and the voicemail/missed call alert (MCA) server 209 are computer systems that are programmable using high level computer programming languages. In an embodiment, the call receiving client application (CRCA) 205*c* is implemented on the user device 255 using programmed and purposeful hardware. As exemplarily illustrated in FIGS. 6A-6B, the user device 255, the carrier ICRS 208, the cloud ICRS 210, the carrier media platform 207, the cloud media platform 213, and the voicemail/MCA server 209 comprise non-transitory computer readable storage media, for example, memory units 250, 230, 236, 216, 242, and 223 respectively, for storing program instructions, applications, and data. As used herein, "non-transitory computer readable storage media" refer to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, for example, 248, or 229, or 235, or 215, or 241, or 222.

The call receiving client application (CRCA) 205*c* and a client database 251 are installed and stored in the memory unit 250 of the user device 255. The memory unit 250 of the user device 255 stores computer program instructions defined by modules, for example, 205*e*, 205*f*, 205*g*, 205*h*, 205*i*, 205*j*, 205*k*, etc., of the CRCA 205*c* exemplarily illustrated in FIG. 3A. Similarly, the memory unit 230 of the carrier incoming call routing server (ICRS) 208 stores computer program instructions defined by carrier ICRS modules 231, for example, 208*a*, 208*b*, 208*c*, 208*d*, etc., of the carrier ICRS 208 exemplarily illustrated in FIG. 4B; the memory unit 236 of the cloud ICRS 210 stores computer program instructions defined by cloud ICRS modules 237, for example, 210*a*, 210*b*, 210*c*, 210*d*, 210*e*, 210*f*, 210*g*, 210*h*, 210*i*, 210*j*, 210*k*, 210*l*, 210*m*, etc., of the cloud ICRS 210 exemplarily illustrated in FIG. 4A; the memory unit 216 of the carrier media platform 207 stores computer program instructions defined by carrier media platform (MP) modules 217, for example, 207*a*, 207*b*, 207*c*, 207*d*, 207*e*, 207*f*, 207*g*, 207*h*, 207*i*, 207*j*, 207*k*, 207*l*, 207*m*, 207*n*, etc., of the carrier media platform 207 exemplarily illustrated in FIG. 3A and FIG. 5A; the memory unit 242 of the cloud media platform 213 stores computer program instructions defined by cloud media platform (MP) modules 243, for example, 213*a*, 213*b*, 213*c*, 213*d*, 213*e*, 213*f*, 213*g*, 213*h*, 213*i*, 213*j*, 213*k*, 213*l*, 213*m*, 213*n*, etc., of the cloud media platform 213 exemplarily illustrated in FIG. 3B and FIG. 5B; and the memory unit 223 of the voicemail/missed call alert (MCA) server 209 stores computer program instructions defined by a missed call alert notification module 224 of the voicemail/MCA server 209. The memory units 250, 230, 236, 216, 242, and 223 of the user device 255, the carrier ICRS 208, the cloud ICRS 210, the carrier media platform 207, the cloud media platform 213, and the voicemail/MCA server 209 respectively, are, for example, random access memories (RAMs) or other types of dynamic storage devices that store information and instructions for execution by the processors 248, 229, 235, 215, 241, and 222 of the user device 255, the carrier ICRS 208, the cloud ICRS 210, the carrier media platform 207, the cloud media platform 213, and the voicemail/MCA server 209 respectively. The memory units 250, 230, 236, 216, 242, and 223 also store temporary variables and other intermediate information used during execution of the instructions by the processors 248, 229, 235, 215, 241, and 222 respectively. The user device 255, the carrier ICRS 208, the cloud ICRS 210, the carrier media platform 207, the cloud media platform 213, and the voicemail/MCA server 209, each further comprises a read only memory (ROM) or another type of static storage device that stores static information and instructions for the processors 248, 229, 235, 215, 241, and 222 respectively.

The processors 248, 229, 235, 215, 241, and 222 are communicatively coupled to the memory units 250, 230, 236, 216, 242, and 223 of the user device 255, the carrier incoming call routing server (ICRS) 208, the cloud ICRS 210, the carrier media platform 207, the cloud media platform 213, and the voicemail/missed call alert (MCA) server 209 respectively. The processor 248 of the user device 255 executes computer program instructions defined by the call receiving client application (CRCA) 205c. The processor 229 of the carrier incoming call routing server (ICRS) 208 executes computer program instructions defined by the carrier ICRS modules 231. The processor 235 of the cloud ICRS 210 executes computer program instructions defined by the cloud ICRS modules 237. The processor 215 of the carrier media platform 207 executes computer program instructions defined by the carrier media platform (MP) modules 217. The processor 241 of the cloud media platform 213 executes computer program instructions defined by the cloud media platform (MP) modules 243. The processor 222 of the voicemail/MCA server 209 executes computer program instructions defined by the missed call alert notification module 224 of the voicemail/MCA server 209. The processors 248, 229, 235, 215, 241, and 222 of the user device 255, the carrier ICRS 208, the cloud ICRS 210, the carrier media platform 207, the cloud media platform 213, and the voicemail/MCA server 209 respectively, refer to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, each of the processors 248, 229, 235, 215, 241, and 222 is implemented as a processor set comprising, for example, a programmed microprocessor and a math or graphics co-processor. The processors 248, 229, 235, 215, 241, and 222 are selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The system 200 disclosed herein is not limited to employing the processors 248, 229, 235, 215, 241, and 222. In an embodiment, the system 200 employs controllers or microcontrollers.

As exemplarily illustrated in FIGS. 6A-6B, the user device 255, the carrier incoming call routing server (ICRS) 208, the cloud ICRS 210, the carrier media platform 207, the cloud media platform 213, and the voicemail/missed call alert (MCA) server 209 further comprise data buses 252, 232, 238, 219, 245, and 226, network interfaces 253, 233, 239, 220, 246, and 227, and common modules 254, 234, 240, 221, 247, and 228 respectively, where the common modules 254, 234, 240, 221, 247, and 228 comprise input/output (I/O) controllers, input devices, output devices, fixed media drives such as hard drives, removable media drives for receiving removable media, etc. The data bus 252 of the user device 255 permits communication between the modules, for example, 248, 249, 250, 253, 254, etc., of the user device 255. The data bus 232 of the carrier ICRS 208 permits communication between the modules, for example, 229, 230, 233, 234, etc., of the carrier ICRS 208. The data bus 238 of the cloud ICRS 210 permits communication between the modules, for example, 235, 236, 239, 240, etc., of the cloud ICRS 210. The data bus 219 of the carrier media platform 207 permits communication between the modules, for example, 215, 216, 220, 221, etc., of the carrier media platform 207. The data bus 245 of the cloud media platform 213 permits communication between the modules, for example, 241, 242, 246, 247, etc., of the cloud media platform 213. The data bus 226 of the voicemail/MCA server 209 permits communication between the modules, for example, 222, 223, 227, 228, etc., of the voicemail/MCA server 209.

The network interfaces 253, 239, 246, and 227 enable connection of the user device 255, the cloud incoming call routing server (ICRS) 210, the cloud media platform 213, and the voicemail/missed call alert (MCA) server 209 respectively, to the public data network 212. The network interfaces 233, 239, 220, and 246 enable connection of the carrier ICRS 208, the cloud ICRS 210, the carrier media platform 207, and the cloud media platform 213 respectively, to the secure data network 211. In an embodiment, the network interfaces 253, 233, 239, 220, 246, and 227 of the user device 255, the carrier ICRS 208, the cloud ICRS 210, the carrier media platform 207, the cloud media platform 213, and the voicemail/MCA server 209 respectively, are provided as interface cards also referred to as line cards. The network interfaces 253, 233, 239, 220, 246, and 227 are, for example, one or more of infrared (IR) interfaces, interfaces implementing Wi-Fi® of Wi-Fi Alliance Corporation, universal serial bus (USB) interfaces, FireWire® interfaces of Apple Inc., Ethernet interfaces, frame relay interfaces, cable interfaces, digital subscriber line (DSL) interfaces, token ring interfaces, peripheral controller interconnect (PCI) interfaces, local area network (LAN) interfaces, wide area network (WAN) interfaces, interfaces using serial protocols, interfaces using parallel protocols, Ethernet communication interfaces, asynchronous transfer mode (ATM) interfaces, high speed serial interfaces (HSSIs), fiber distributed data interfaces (FDDIs), interfaces based on transmission control protocol (TCP)/internet protocol (IP), interfaces based on wireless communications technology such as satellite technology, radio frequency (RF) technology, near field communication, etc. The I/O controllers of the user device 255, the carrier ICRS 208, the cloud ICRS 210, the carrier media platform 207, the cloud media platform 213, and the voicemail/MCA server 209 control input actions and output actions performed by the user device 255, the carrier ICRS 208, the cloud ICRS 210, the carrier media platform 207, the cloud media platform 213, and the voicemail/MCA server 209 respectively.

In an embodiment, the user device 255 further comprises a display unit 249 that displays the graphical user interface (GUI) 205d rendered by the call receiving client application (CRCA) 205c. The display unit 249 is, for example, a video display, a liquid crystal display, a plasma display, an organic light emitting diode (OLED) based display, etc. The display unit 249, via the GUI 205d, displays information, displays interfaces, user interface elements such as swipable arrows, icons, search boxes, etc., for example, for logging in and logging out of the CRCA 205c, interacting with the calling party device 201 exemplarily illustrated in FIGS. 2A-2B, etc. The CRCA 205c renders the GUI 205d on the display unit 249 to receive user inputs, for example, entering the username or number and password for signing into the CRCA 205c. The GUI 205d is, for example, an online web interface, a web based downloadable application interface, a mobile based downloadable application interface, etc.

The client database 251 in the user device 255, the carrier incoming call routing server (ICRS) database 208e in the carrier ICRS 208, the cloud ICRS database 210n in the cloud ICRS 210, the carrier media platform (MP) database 218 in the carrier media platform 207, the cloud MP database 244 in the cloud media platform 213, and the voicemail/missed call alert (MCA) database 225 in the voicemail/MCA server 209 can be any storage area or medium that can be used for storing one or more numbers received from the user, registration information, and deregistration information of the call receiving client application (CRCA) 205c on the user device 255. In an embodiment, the client database 251, the carrier ICRS database 208e, the cloud ICRS database 210n, the carrier MP database 218, the cloud MP database 244, and the voicemail/MCA database 225 are external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the client database 251, the carrier ICRS database 208e, the cloud ICRS database 210n, the carrier MP database 218, the cloud MP database 244, and the voicemail/MCA database 225 can also be locations on respective file systems of the user device 255, the carrier ICRS 208, the cloud ICRS 210, the carrier media platform 207, the cloud media platform 213, and the voicemail/MCA server 209 respectively. In another embodiment, the client database 251, the carrier ICRS database 208e, the cloud ICRS database 210n, the carrier MP database 218, the cloud MP database 244, and the voicemail/MCA database 225 can be remotely accessed by the user device 255, the carrier ICRS 208, the cloud ICRS 210, the carrier media platform 207, the cloud media platform 213, and the voicemail/MCA server 209 respectively via the public data network 212 or the secure data network 211. In another embodiment, the client database 251, the carrier ICRS database 208e, the cloud ICRS database 210n, the carrier MP database 218, the cloud MP database 244, and the voicemail/MCA database 225 are configured as cloud based databases implemented in a cloud computing environment, where computing resources are delivered as a service over the secure data network 211 and the public data network 212.

Computer applications and programs are used for operating the call receiving client application (CRCA) 205c on the user device 255, the carrier incoming call routing server (ICRS) modules 231 on the carrier ICRS 208, the cloud ICRS modules 237 on the cloud ICRS 210, the carrier media platform (MP) modules 217 on the carrier media platform 207, the cloud MP modules 243 on the cloud media platform 213, and the missed call alert notification module 224 on the voicemail/missed call alert (MCA) server 209. The programs are loaded onto the respective fixed media drives and into the memory units 250, 230, 236, 216, 242, and 223 of the user device 255, the carrier ICRS 208, the cloud ICRS 210, the carrier media platform 207, the cloud media platform 213, and the voicemail/MCA server 209 respectively, via the respective removable media drives. In an embodiment, the computer applications and programs are loaded directly into the memory units 250, 230, 236, 216, 242, and 223 of the user device 255, the carrier ICRS 208, the cloud ICRS 210, the carrier media platform 207, the cloud media platform 213, and the voicemail/MCA 209 respectively, via the public data network 212 or the secure data network 211.

Each of the processors 248, 229, 235, 215, 241, and 222 of the user device 255, the carrier incoming call routing server (ICRS) 208, the cloud ICRS 210, the carrier media platform 207, the cloud media platform 213, and the voicemail/missed call alert (MCA) server 209 respectively, executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The user device 255, the carrier ICRS 208, the cloud ICRS 210, the carrier media platform 207, the cloud media platform 213, and the voicemail/MCA server 209, employ their respective operating systems for performing multiple tasks. The operating systems of the user device 255, the carrier ICRS 208, the cloud ICRS 210, the carrier media platform 207, the cloud media platform 213, and the voicemail/MCA server 209 are responsible for management and coordination of activities and sharing of their respective resources. The operating systems further manage security, peripheral devices, and network connections. The operating systems recognize, for example, inputs provided by the user via the user device 255, files, and directories stored locally on the fixed media drives. The operating systems of the user device 255, the carrier ICRS 208, the cloud ICRS 210, the carrier media platform 207, the cloud media platform 213, and the voicemail/MCA server 209 execute different programs using the processors 248, 229, 235, 215, 241, and 222 respectively. The processors 248, 229, 235, 215, 241, and 222 and the operating systems of the user device 255, the carrier ICRS 208, the cloud ICRS 210, the carrier media platform 207, the cloud media platform 213, and the voicemail/MCA server 209 respectively, together define a computer platform for which application programs in high level programming languages are written.

The processor 248 of the user device 255 retrieves instructions defined by the sign up module 205e, the number validation module 205f, the login module 205g, the logout module 205h, the primary number setting module 205i, the additional number linking module 205j, and the secondary number delinking module 205k of the call receiving client application (CRCA) 205c exemplarily illustrated in FIGS. 3A-3B, in the memory unit 250 of the user device 255, for performing respective functions disclosed in the detailed description of FIGS. 3A-3B. The processor 248 of the user device 255 retrieves instructions for executing the modules 205e, 205f, 205g, 205h, 205i, 205j, 205k, etc., of the CRCA 205c. The processor 229 of the carrier incoming call routing server (ICRS) 208 retrieves instructions defined by the validation code communication module 208b of the validation module 208a, the query processing module 208c, and the client registration module 208d, exemplarily illustrated in FIG. 4B, in the memory unit 230 of the carrier ICRS 208, for performing respective functions disclosed in the detailed description of FIG. 4B. The processor 229 of the carrier ICRS 208 retrieves instructions for executing the modules 208a, 208b, 208c, 208d, etc., of the carrier ICRS 208. The processor 235 of the cloud ICRS 210 retrieves instructions defined by the user sign up processing module 210a, the number validation module 210c of the validation module 210b, the login processing module 210d, the logout processing module 210e, the primary number setting module 210f, the additional number linking module 210g, the number delinking module 210h, the query processing module 210i, the client registration module 210j, and the data network connection detection module 210l and the client registration detection module 210m of the client application availability detection module 210k exemplarily illustrated in FIG. 4A, in the memory unit 236 of the cloud ICRS 210, for performing respective functions disclosed in the detailed description of FIG. 4A. The processor 235 of the cloud ICRS 210 retrieves instructions for executing the modules 210a, 210b, 210c, 210d, 210e, 210f, 210g, 210h, 210i, 210j, 210k, 210l, 210m, etc., of the cloud ICRS 210.

The processor 215 of the carrier media platform 207 retrieves instructions defined by the data network detection module 207a, the codec module 207b, the voice over internet protocol (VOIP) data exchange module 207c, the incoming call registration module 207d, the incoming call notification module 207e, the device ringing module 207f, the call rejection module 207g, the call connect module 207h, the call termination module 207i, the incoming missed call processing module 207j, the number extraction module 207k, the query processing module 207l, the response processing module 207m, and the call routing module 207n exemplarily illustrated in FIG. 3A and FIG. 5A, in the memory unit 216 of the carrier media platform 207 for performing respective functions disclosed in the detailed description of FIG. 3A and FIG. 5A. The processor 215 of the carrier media platform 207 retrieves instructions for executing the modules, for example, 207a, 207b, 207c, 207d, 207e, 207f, 207g, 207h, 207i, 207j, 207k, 207l, 207m, 207n, etc., of the carrier media platform 207. The processor 241 of the cloud media platform 213 retrieves instructions defined by the data network detection module 213a, the codec module 213b, the voice over internet protocol (VOIP) data exchange module 213c, the incoming call registration module 213d, the incoming call notification module 213e, the device ringing module 213f, the call rejection module 213g, the call connect module 213h, the call termination module 213i, the incoming missed call processing module 213j, the number extraction module 213k, the query processing module 213l, the response processing module 213m, and the call routing module 213n exemplarily illustrated in FIG. 3B and FIG. 5B, in the memory unit 242 of the cloud media platform 213 for performing respective functions disclosed in the detailed description of FIG. 3B and FIG. 5B. The processor 241 of the cloud media platform 213 retrieves instructions for executing the modules 213a, 213b, 213c, 213d, 213e, 213f, 213g, 213h, 213i, 213j, 213k, 213l, 213m, 213n, etc., of the cloud media platform 213. The processor 222 of the voicemail/MCA server 209 retrieves instructions defined by the missed call alert notification module 224 in the memory unit 223 of the voicemail/MCA server 209. The missed call alert notification module 224 sends a missed call alert notification, for example, as a short message service (SMS) message to the unreachable number indicating that the calling party device 201 was trying to place a call to the user device 255 at a specified time. The processor 222 of the voicemail/MCA server 209 retrieves instructions for executing the missed call alert notification module 224 of the voicemail/MCA server 209.

A program counter determines the location of the instructions in each of the memory units 250, 230, 236, 216, 242, and 223. The program counter stores a number that identifies the current position in the program of each of the modules, for example, 205d, 205e, 205f, 205g, 205h, 205i, 205j, 205k, etc., of the user device 255, the carrier incoming call routing server (ICRS) modules 231, the cloud ICRS modules 237, the carrier media platform (MP) modules 217, the cloud MP modules 243, and the missed call alert notification module 224 of the voicemail/MCA server 209 respectively. The instructions fetched by the processors 248, 229, 235, 215, 241, and 222 from the memory units 250, 230, 236, 216, 242, and 223 respectively, after being processed are decoded. The instructions are stored in an instruction register in each of the processors 248, 229, 235, 215, 241, and 222. After processing and decoding, the processors 248, 229, 235, 215, 241, and 222 execute the instructions, thereby performing one or more processes defined by those instructions.

At the time of execution, the instructions stored in the instruction register are examined to determine the operations to be performed. The processors 248, 229, 235, 215, 241, and 222 of the user device 255, the carrier incoming call routing server (ICRS) 208, the cloud ICRS 210, the carrier media platform 207, the cloud media platform 213, and the voicemail/MCA server 209 respectively, then perform the specified operations. The operations comprise arithmetic operations and logic operations. The respective operating systems perform multiple routines for performing a number of tasks required to assign the memory units 250, 230, 236, 216, 242, and 223 for execution of the modules, for example, 205d, 205e, 205f, 205g, 205h, 205i, 205j, 205k, etc., on the user device 255, the carrier ICRS modules 231, the cloud ICRS modules 237, the carrier media platform (MP) modules 217, the cloud MP modules 243, and the missed call alert notification module 224 on the voicemail/MCA server 209 respectively. The tasks performed by the operating systems comprise, for example, assigning memory to the modules, for example, 205d, 205e, 205f, 205g, 205h, 205i, 205j, 205k, etc., on the user device 255, the carrier ICRS modules 231, the cloud ICRS modules 237, the carrier MP modules 217, the cloud MP modules 243, and the missed call alert notification module 224 on the voicemail/MCA server 209 respectively, and to data used by the user device 255, the carrier ICRS 208, the cloud ICRS 210, the carrier media platform 207, the cloud media platform 213, and the voicemail/MCA server 209 respectively, moving data between the memory units 250, 230, 236, 216, 242, and 223 and disk units, and handling input/output operations. The operating systems perform the tasks on request by the operations and after performing the tasks, the respective operating systems transfer the execution control back to the processors 248, 229, 235, 215, 241, and 222. The processors 248, 229, 235, 215, 241, and 222 continue the execution to obtain one or more outputs. The outputs of the execution of the modules, for example, 205d, 205e, 205f, 205g, 205h, 205i, 205j, 205k, etc., on the user device 255, the carrier ICRS modules 231, the cloud ICRS modules 237, the carrier MP modules 217, the cloud MP modules 243, and the missed call alert notification module 224 on the voicemail/MCA server 209 respectively, are displayed on output devices.

For purposes of illustration, the detailed description refers to the user device 255, the carrier incoming call routing server (ICRS) 208, the cloud ICRS 210, the carrier media platform 207, the cloud media platform 213, and the voicemail/missed call alert (MCA) server 209 being run locally as single computer systems; however the scope of the method and the system 200 disclosed herein is not limited to the user device 255, the carrier ICRS 208, the cloud ICRS 210, the carrier media platform 207, the cloud media platform 213, and the voicemail/MCA server 209 being run locally on single computer systems via their respective operating systems and processors 248, 229, 235, 215, 241, and 222, but may be extended to run remotely over the secure data network 211 and the public data network 212 by employing a web browser and a remote server, a mobile phone, or other electronic devices. In an embodiment, one or more portions of the call routing system 206 are distributed across one or more computer systems coupled to the secure data network 211 and the public data network 212. Furthermore, although the detailed description of FIGS. 6A-6B relates to an implementation of the call routing system 206 comprising the carrier ICRS 208, the cloud ICRS 210, the carrier media platform 207, the cloud media platform 213, and the voicemail/MCA server 209, the call routing system 206 is not limited to be implemented using the carrier ICRS 208, the cloud ICRS 210, the carrier media platform 207, the cloud media platform 213, and the voicemail/MCA server 209, but may be extended to be implemented using a single server or a network of two or more servers.

The non-transitory computer readable storage medium disclosed herein stores computer program codes comprising instructions executable by one or more of the processors 229, 235, 215, and 241 for routing an incoming call made to one of multiple numbers of the user, to the call receiving client application (CRCA) 205c deployed on one or more of multiple user devices when one of the numbers is not reachable. The computer program codes implement processes of various embodiments disclosed above. The computer program codes comprise a first computer program code for setting up a user account for the user using one or more of multiple numbers of the user in communication with the CRCA 205c deployed on one or more of the user devices; a second computer program code for detecting availability of the CRCA 205c on one or more of the user devices over the public data network 212 to accept an incoming call; a third computer program code for receiving the incoming call made to one of the numbers, when one of the numbers is not reachable; and a fourth computer program code for routing the received incoming call to the CRCA 205c on one or more of the user devices over the public data network 212 on detecting the availability of the CRCA 205c on one or more of the user devices over the public data network 212.

In an embodiment, the third computer program code comprises a fifth computer program code for receiving the incoming call made to one of the numbers forwarded by a carrier via a routing number, and a sixth computer program code for determining whether one of the numbers is linked to the user account to route the incoming call to the call receiving client application (CRCA) 205c on one or more of the user devices over the public data network 212. The computer program codes further comprise a seventh computer program code for validating the numbers of the user through one or more of multiple authentication mechanisms; an eighth computer program code for linking one or more of the numbers of the user to the user account; and a ninth computer program code for delinking one or more of the numbers of the user from the user account. In an embodiment, the second computer program code comprises a tenth computer program code for detecting a connection of the CRCA 205c to the public data network 212; an eleventh computer program code for detecting registration of the CRCA 205c on one or more of the user devices; and a twelfth computer program code for detecting deregistration of the CRCA 205c on one or more of the user devices.

In an embodiment, the computer program codes further comprise a thirteenth computer program code for routing the received incoming call to the voicemail/missed call alert (MCA) server 209 on detecting an unavailability of the call receiving client application (CRCA) 205c on each of one or more of the user devices. In an embodiment, the computer program codes further comprise a fourteenth computer program code for routing the received incoming call to the voicemail/MCA server 209 if the incoming call is not accepted for a preconfigured period of time from any of the user devices. In an embodiment, the fourth computer program code comprises a fifteenth computer program code for routing the received incoming call to the CRCA 205c on one or more of the user devices over the public data network 212 via the cloud media platform 213 deployed in the distributed cloud computing environment, when the incoming call is made to one of the numbers associated with a carrier that does not permit direct data communication between servers in the secure data network 211 of the carrier and the user devices. In an embodiment, the computer program codes further comprise a sixteenth computer program code for selecting an optimum codec for communicating with the CRCA 205c on one or more of the user devices based on available bandwidth between the carrier media platform 207 or, in an embodiment, the cloud media platform 213, and the CRCA 205c; and a seventeenth computer program code for implementing transcoding for converting a codec used for communication between a network component and the carrier media platform 207 or, in an embodiment, the cloud media platform 213, to the optimum codec used for communication between the carrier media platform 207 or, in an embodiment, the cloud media platform 213, and the CRCA 205c. In an embodiment, the computer program codes further comprises an eighteenth computer program code for setting a password for logging into the CRCA 205c deployed on one or more user devices with one or more of the numbers of the user.

The computer program codes further comprise one or more additional computer program codes for performing additional steps that may be required and contemplated for routing an incoming call made to one of multiple numbers of a user, to the call receiving client application (CRCA) 205c deployed on one or more user devices when one of the numbers is not reachable. In an embodiment, a single piece of computer program code comprising computer executable instructions performs one or more steps of the method disclosed herein for routing an incoming call made to one multiple numbers of the user to the CRCA 205c deployed on one or more user devices when one of the numbers is not reachable. The computer program codes comprising computer executable instructions are embodied on the non-transitory computer readable storage medium. The processors 229, 235, 215, and 241 of the carrier ICRS 208, the cloud ICRS 210, the carrier media platform 207, and the cloud media platform 213 respectively, retrieve their respective computer executable instructions and execute them. When the computer executable instructions are executed by the processors 229, 235, 215, and 241, the computer executable instructions cause the processors 229, 235, 215, and 241 to perform the steps of the method for routing an incoming call made to one of multiple numbers of the user to the CRCA 205c deployed on one or more user devices when one of the numbers is not reachable.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used in the method disclosed herein are C, C++, C#, Java®, JavaScript®, Fortran, Ruby, Perl®, Python®, Visual Basic®, hypertext preprocessor (PHP), Microsoft®.NET, Objective-C®, the Swift™ programming language of Apple Inc., etc. Other object-oriented, functional, scripting, and/or logical programming languages can also be used. In an embodiment, the computer program codes or software programs are stored on or in one or more mediums as object code. In another embodiment, various aspects of the method and the system 200 exemplarily illustrated in FIGS. 2A-2D, disclosed herein are implemented in a non-programmed environment comprising documents created, for example, in a hypertext markup language (HTML), an extensible markup language (XML), or other format that render aspects of the graphical user interface (GUI) 205d exemplarily illustrated in FIGS. 3A-3B and FIG. 6B, or perform other functions. In another embodiment, various aspects of the method and the system 200 disclosed herein are implemented as programmed elements, or non-programmed elements, or any suitable combination thereof.

Where databases are described such as the client database 251, the carrier incoming call routing server (ICRS) database 208e, the cloud ICRS database 210n, the carrier media platform database 218, and the voicemail/missed call alert (MCA) database 225 exemplarily illustrated in FIGS. 6A-6B, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system 200, the databases are integrated to communicate with each other for enabling simultaneous updates of data linked across the databases, when there are any updates to the data in one of the databases.

The method and the system 200 disclosed herein can be configured to work in a network environment comprising one or more computers that are in communication with one or more devices via the secure data network 211 and the public data network 212 exemplarily illustrated in FIGS. 2A-2D and FIGS. 6A-6B. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the secure data network 211 and the public data network 212. Each of the computers and the devices executes an operating system, examples of which are disclosed above. While the operating system may differ depending on the type of computer, the operating system provides the appropriate communications protocols to establish communication links with the secure data network 211 and the public data network 212. Any number and type of machines may be in communication with the computers.

The method and the system 200 disclosed herein are not limited to a particular computer system platform, processor, operating system, or network. In an embodiment, one or more aspects of the method and the system 200 disclosed herein are distributed among one or more computer systems, for example, servers configured to provide one or more services to one or more client computers, or to perform a complete task in a distributed system. For example, one or more aspects of the method and the system 200 disclosed herein are performed on a client-server system that comprises components distributed among one or more server systems that perform multiple functions according to various embodiments. These components comprise, for example, executable, intermediate, or interpreted code, which communicate over the secure data network 211 and the public data network 212 using communication protocols. The method and the system 200 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the system 200 disclosed herein. While the method and the system 200 have been described with reference to various embodiments, it is understood that the words, which have been used herein, are words of description and illustration, rather than words of limitation. Further, although the method and the system 200 have been described herein with reference to particular means, materials, and embodiments, the method and the system 200 are not intended to be limited to the particulars disclosed herein; rather, the method and the system 200 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the system 200 disclosed herein in their aspects.

We claim:

1. A method for routing an incoming call made to one of a plurality of numbers of a user, to a call receiving client application deployed on one or more of a plurality of user devices when said one of said numbers is not reachable, said method employing a call routing system comprising one or more processors configured to execute computer program instructions for performing said method, said method comprising:

setting up a user account for said user using one or more of said plurality of numbers of said user by said call routing system in communication with said call receiving client application deployed on said one or more of said user devices, wherein said setting up said user account comprises validating said one or more of said numbers of said user by said call routing system through one or more of a plurality of authentication mechanisms, wherein said authentication mechanisms comprise:

transmitting a validation code to each of said one or more of said numbers of said user to be validated by said call routing system via one of a message and an outbound dialing call initiated by said call routing system, receiving an input code captured by said call receiving client application from one of said user devices, and matching said received input code with said transmitted validation code;

sending a message to each of said one or more of said numbers of said user to be validated by said call routing system and receiving a confirmation from said call receiving client application that said sent message is received on one of said user devices indicating that said one of said user devices contains a subscriber identity module with one of said one or more of said numbers of said user to be validated;

receiving a message sent from said call receiving client application on one of said user devices to a predetermined number and matching a source number of said message with one of said one or more of said numbers of said user to be validated; and receiving a missed call placed by said call receiving client application on one of said user devices to a predefined number and matching a source number of said missed call with one of said one or more of said numbers of said user to be validated;

detecting availability of said call receiving client application on said one or more of said user devices over a data network by said call routing system to accept said incoming call;

receiving said incoming call made to said one of said numbers by said call routing system, when said one of said numbers is not reachable; and routing said received incoming call to said call receiving client application on said one or more of said user devices over said data network by said call routing system on detecting said availability of said call receiving client application on said one or more of said user devices over said data network.

2. The method of claim 1, wherein said numbers of said user are associated with one of a single carrier in a single geographical location, different carriers in said single geographical location, said single carrier in a plurality of different geographical locations, and said different carriers in said different geographical locations.

3. The method of claim 1, wherein said call routing system receives said incoming call made to said one of said numbers forwarded by a carrier via a routing number, and determines whether said one of said numbers is linked to said user account set up by said call routing system to route said incoming call to said call receiving client application on said one or more of said user devices over said data network.

4. The method of claim 1, further comprising linking said one or more of said numbers of said user to said user account by said call routing system, and delinking said one or more of said numbers of said user from said user account by said call routing system.

5. The method of claim 1, wherein said detection of said availability of said call receiving client application on said one or more of said user devices over said data network to accept said incoming call comprises one of:

detecting a connection of said call receiving client application to said data network by said call routing system;

detecting registration of said call receiving client application on said one or more of said user devices by said call routing system; and detecting deregistration of said call receiving client application on said one or more of said user devices by said call routing system.

6. The method of claim 1, further comprising routing said received incoming call to an alerting server of said call routing system on detecting an unavailability of said call receiving client application on each of said one or more of said user devices, wherein said alerting server is one of a voicemail server and a missed call alert server.

7. The method of claim 1, further comprising routing said received incoming call to an alerting server of said call routing system if said incoming call is not accepted for a preconfigured period of time from any of said one or more of said user devices, wherein said alerting server is one of a voicemail server and a missed call alert server.

8. The method of claim 1, wherein said call routing system routes said received incoming call to said call receiving client application on said one or more of said user devices over said data network via a media platform deployed in a distributed cloud computing environment, when said incoming call is made to said one of said numbers associated with a carrier that does not permit direct data communication between servers in a secure data network of said carrier and said user devices.

9. The method of claim 1, further comprising selecting an optimum codec for communicating with said call receiving client application on said one or more of said user devices by said call routing system based on available bandwidth between said call routing system and said call receiving client application, and implementing transcoding for converting a codec used for communication between a network component and said call routing system to said optimum codec used for communication between said call routing system and said call receiving client application.

10. The method of claim 1, wherein said one of said numbers is deemed not reachable when one of: said one or more of said user devices associated with said one of said numbers do not have access to a telecommunications network, said one or more of said user devices associated with said one of said numbers are out of network coverage, said one or more of said user devices associated with said one of said numbers are switched off, said one of said numbers is busy, and said incoming call to said one of said numbers is unanswered.

11. The method of claim 1, further comprising setting a password for logging into said call receiving client application deployed on said one or more of said user devices with said one or more of said numbers of said user by said call routing system.

12. The method of claim 1, wherein said numbers of said user comprise a primary number and a plurality of secondary numbers.

13. A system for routing an incoming call made to one of a plurality of numbers of a user, to a call receiving client application deployed on one or more of a plurality of user devices when said one of said numbers is not reachable, said system comprising:
 a non-transitory computer readable storage medium for storing computer program instructions defined by modules of a call routing system; and
 one or more processors communicatively coupled to said non-transitory computer readable storage medium for executing said computer program instructions defined by said modules of said call routing system, said modules of said call routing system comprising:
  a user sign up processing module for setting up a user account for said user using one or more of said plurality of numbers of said user in communication with said call receiving client application deployed on said one or more of said user devices, wherein said setting up said user account comprises a validation module of said call routing system validating said one or more of said numbers of said user through one or more of a plurality of authentication mechanisms, wherein said authentication mechanisms implemented by said validation module comprise:
   transmitting a validation code to each of said one or more of said numbers of said user to be validated by said validation module via one of a message and an outbound dialing call initiated by said validation module, receiving an input code captured by said call receiving client application from one of said user devices, and matching said received input code with said transmitted validation code;
   sending a message to each of said one or more of said numbers of said user to be validated and receiving a confirmation from said call receiving client application that said sent message is received on one of said user devices indicating that said one of said user devices contains a subscriber identity module with one of said one or more of said numbers of said user to be validated;
   receiving a message sent from said call receiving client application on one of said user devices to a predetermined number and matching a source number of said message with one of said one or more of said numbers of said user to be validated; and
   receiving a missed call placed by said call receiving client application on one of said user devices to a predefined number and matching a source number of said missed call with one of said one or more of said numbers of said user to be validated;
  a client application availability detection module for detecting availability of said call receiving client application on said user devices, over a data network, to accept said incoming call, wherein said user devices are associated with said multiple telephone numbers of said user;
  an incoming call registration module for receiving said incoming call made to said any of said multiple telephone numbers of said user, when said called telephone number is not reachable; and
  a call routing module for routing said received incoming call to said call receiving client application on said one or more of said user devices over said data network on detecting said availability of said call receiving client application on said user devices to accept said incoming call, wherein said user devices are associated with said multiple telephone numbers of said user.

14. The system of claim 13, wherein said incoming call registration module receives said incoming call made to said one of said numbers forwarded by a carrier via a routing number, and determines whether said one of said numbers is linked to said user account set up by said user sign up processing module to route said incoming call to said call receiving client application on said one or more of said user devices over said data network.

15. The system of claim 13, wherein said numbers of said user are associated with one of a single carrier in a single geographical location, different carriers in said single geographical location, said single carrier in a plurality of different geographical locations, and said different carriers in said different geographical locations.

16. The system of claim 13, wherein said modules of said call routing system further comprise:
 an additional number linking module for linking said one or more of said numbers of said user to said user account; and
 a number delinking module for delinking said one or more of said numbers of said user from said user account.

17. The system of claim 13, wherein said client application availability detection module comprises:
 a data network connection detection module for detecting a connection of said call receiving client application to said data network; and
 a client registration detection module for detecting registration and deregistration of said call receiving client application on said one or more of said user devices.

18. The system of claim 13, wherein said call routing module routes said received incoming call to an alerting server of said call routing system on detecting an unavailability of said call receiving client application on each of said one or more of said user devices, wherein said alerting server is one of a voicemail server and a missed call alert server.

19. The system of claim 13, wherein said call routing module routes said received incoming call to an alerting server of said call routing system if said incoming call is not accepted for a preconfigured period of time from any of said one or more of said user devices, wherein said alerting server is one of a voicemail server and a missed call alert server.

20. The system of claim 13, wherein said call routing module routes said received incoming call to said call receiving client application on said one or more of said user devices over said data network via a media platform deployed in a distributed cloud computing environment, when said incoming call is made to said one of said numbers associated with a carrier that does not permit direct data communication between servers in a secure data network of said carrier and said user devices.

21. The system of claim 13, wherein said modules of said call routing system further comprise a codec module for selecting an optimum codec for communicating with said call receiving client application on said one or more of said user devices based on available bandwidth between said call routing system and said call receiving client application, and implementing transcoding for converting a codec used for communication between a network component and said call routing system to said optimum codec used for communication between said call routing system and said call receiving client application.

22. The system of claim 13, wherein said user sign up processing module sets a password for logging into said call receiving client application deployed on said one or more of said user devices with said one or more of said numbers of said user.

23. The system of claim 13, wherein said one or more of said user devices deploying said call receiving client application run one of a single operating system and different operating systems, and wherein said one or more of said user devices are manufactured by one of a single vendor and different vendors.

24. A non-transitory computer readable storage medium having embodied thereon, computer program codes comprising instructions executable by one or more processors for routing an incoming call made to one of a plurality of numbers of a user, to a call receiving client application deployed on one or more of a plurality of user devices when said one of said numbers is not reachable, said computer program codes comprising:
  a first computer program code for setting up a user account for said user using one or more of said plurality of numbers of said user in communication with said call receiving client application deployed on said one or more of said user devices, wherein said setting up said user account comprises validating said one or more of said numbers of said user through one or more of a plurality of authentication mechanisms, wherein said authentication mechanisms comprise:
    transmitting a validation code to each of said one or more of said numbers of said user to be validated by said call routing system via one of a message and an outbound dialing call initiated by said call routing system, receiving an input code captured by said call receiving client application from one of said user devices, and matching said received input code with said transmitted validation code;
    sending a message to each of said one or more of said numbers of said user to be validated by said call routing system and receiving a confirmation from said call receiving client application that said sent message is received on one of said user devices indicating that said one of said user devices contains a subscriber identity module with one of said one or more of said numbers of said user to be validated;
    receiving a message sent from said call receiving client application on one of said user devices to a predetermined number and matching a source number of said message with one of said one or more of said numbers of said user to be validated; and
    receiving a missed call placed by said call receiving client application on one of said user devices to a predefined number and matching a source number of said missed call with one of said one or more of said numbers of said user to be validated;
  a second computer program code for detecting availability of said call receiving client application on said one or more of said user devices over a data network to accept said incoming call;
  a third computer program code for receiving said incoming call made to said one of said numbers, when said one of said numbers is not reachable; and
  a fourth computer program code for routing said received incoming call to said call receiving client application on said one or more of said user devices over said data network on detecting said availability of said call receiving client application on said one or more of said user devices over said data network.

25. The non-transitory computer readable storage medium of claim 24, wherein said third computer program code comprises:
  a fifth computer program code for receiving said incoming call made to said one of said numbers forwarded by a carrier via a routing number; and
  a sixth computer program code for determining whether said one of said numbers is linked to said user account to route said incoming call to said call receiving client application on said one or more of said user devices over said data network.

26. The non-transitory computer readable storage medium of claim 24, wherein said computer program codes further comprise:
  a seventh computer program code for linking said one or more of said numbers of said user to said user account; and
  an eighth computer program code for delinking said one or more of said numbers of said user from said user account.

27. The non-transitory computer readable storage medium of claim 24, wherein said second computer program code comprises:
  a ninth computer program code for detecting a connection of said call receiving client application to said data network;
  a tenth computer program code for detecting registration of said call receiving client application on said one or more of said user devices; and
  a eleventh computer program code for detecting deregistration of said call receiving client application on said one or more of said user devices.

28. The non-transitory computer readable storage medium of claim 24, wherein said computer program codes further comprise a twelfth computer program code for routing said received incoming call to an alerting server on detecting an unavailability of said call receiving client application on each of said one or more of said user devices, wherein said alerting server is one of a voicemail server and a missed call alert server.

29. The non-transitory computer readable storage medium of claim 24, wherein said computer program codes further comprise a thirteenth computer program code for routing said received incoming call to an alerting server if said incoming call is not accepted for a preconfigured period of time from any of said one or more of said user devices, wherein said alerting server is one of a voicemail server and a missed call alert server.

30. The non-transitory computer readable storage medium of claim 24, wherein said fourth computer program code comprises a fourteenth computer program code for routing said received incoming call to said call receiving client application on said one or more of said user devices over said data network via a media platform deployed in a distributed cloud computing environment, when said incoming call is made to said one of said numbers associated with a carrier that does not permit direct data communication between servers in a secure data network of said carrier and said user devices.

31. The non-transitory computer readable storage medium of claim 24, wherein said computer program codes further comprise:

a fifteenth computer program code for selecting an optimum codec for communicating with said call receiving client application on said one or more of said user devices based on available bandwidth between a call routing system and said call receiving client application; and a sixteenth computer program code for implementing transcoding for converting a codec used for communication between a network component and said call routing system to said optimum codec used for communication between said call routing system and said call receiving client application.

32. The non-transitory computer readable storage medium of claim 24, wherein said computer program codes further comprise an seventeenth computer program code for setting a password for logging into said call receiving client application deployed on said one or more of said user devices with said one or more of said numbers of said user.

* * * * *